(12) United States Patent
Imada et al.

(10) Patent No.: US 12,345,674 B2
(45) Date of Patent: Jul. 1, 2025

(54) GAS SENSOR AND METHOD OF MANUFACTURE THEREOF

(71) Applicant: DENSO CORPORATION, Kariya (JP)

(72) Inventors: Shota Imada, Kariya (JP); Satoshi Suzuki, Kariya (JP); Takumi Ushikubo, Kariya (JP)

(73) Assignee: DENSO CORPORATION, Kariya (JP)

( * ) Notice: Subject to any disclaimer, the term of this patent is extended or adjusted under 35 U.S.C. 154(b) by 669 days.

(21) Appl. No.: 17/557,853

(22) Filed: Dec. 21, 2021

(65) Prior Publication Data
US 2022/0113276 A1    Apr. 14, 2022

Related U.S. Application Data

(63) Continuation of application No. PCT/JP2020/023550, filed on Jun. 16, 2020.

(30) Foreign Application Priority Data

Jun. 27, 2019    (JP) .................... 2019-119478

(51) Int. Cl.
| | |
|---|---|
| *G01N 27/406* | (2006.01) |
| *G01N 27/407* | (2006.01) |
| *G01N 27/409* | (2006.01) |

(52) U.S. Cl.
CPC ..... *G01N 27/4067* (2013.01); *G01N 27/4072* (2013.01); *G01N 27/4073* (2013.01); *G01N 27/4077* (2013.01); *G01N 27/409* (2013.01)

(58) Field of Classification Search
CPC . G01N 27/4067; G01N 27/4072–4073; G01N 27/4077; G01N 27/409
See application file for complete search history.

(56) References Cited

U.S. PATENT DOCUMENTS

| | | | |
|---|---|---|---|
| 2011/0094883 A1* | 4/2011 | Ito ................ | G01N 27/4077 204/429 |
| 2012/0297861 A1 | 11/2012 | Murai et al. | |

(Continued)

FOREIGN PATENT DOCUMENTS

| | | |
|---|---|---|
| JP | 2012-93330 | 5/2012 |
| JP | 2012093330 A * | 5/2012 |

(Continued)

OTHER PUBLICATIONS

U.S. Appl. No. 18/816,329 to Shota Imada et al., filed Aug. 27, 2024 (31 pages).

*Primary Examiner* — James Lin
*Assistant Examiner* — Vivian A Tran
(74) *Attorney, Agent, or Firm* — Nixon & Vanderhye P.C.

(57) ABSTRACT

The sensor element of a gas sensor includes an element body, a surface protective layer provided at the outermost surface position of a tip portion of the element body, in the longitudinal direction of the element body, and an internal protective layer provided between the surface protective layer and the element body. The internal protective layer has a lower thermal conductivity and a higher average porosity than the surface protective layer, and is disposed between the surface protective layer and the element body. In the internal protective layer, a first protective layer portion of the internal protective layer is located on a side that faces the heater, and at least the base position is positioned closer in the longitudinal direction to the tip end of the element body than is the maximum temperature position on the element body.

7 Claims, 12 Drawing Sheets

(56) References Cited

U.S. PATENT DOCUMENTS

| | | | |
|---|---|---|---|
| 2015/0075254 A1* | 3/2015 | Sakuma | G01N 27/4072 |
| | | | 73/23.31 |
| 2016/0018357 A1 | 1/2016 | Nishijima et al. | |
| 2016/0161445 A1* | 6/2016 | Sakakibara | G01N 27/409 |
| | | | 204/424 |
| 2016/0209354 A1* | 7/2016 | Araki | G01N 27/409 |
| 2018/0017514 A1 | 1/2018 | Kato et al. | |
| 2018/0257990 A1* | 9/2018 | Saito | C04B 35/63416 |

FOREIGN PATENT DOCUMENTS

| | | |
|---|---|---|
| JP | 2017-106874 | 6/2017 |
| JP | 2017106874 A * | 6/2017 |

* cited by examiner

GAS SENSOR AND METHOD OF MANUFACTURE THEREOF

CROSS-REFERENCE TO RELATED APPLICATION

This application is the U.S. bypass application of International Application No. PCT/JP2020/023550 filed on Jun. 16, 2020, which designated the U.S. and claims priority to Japanese Patent Application No. 2019-119478, filed on Jun. 27, 2019, the contents of both of which are incorporated herein by reference.

TECHNICAL FIELD

The present disclosure relates to a gas sensor provided with a sensor element, and to a method of manufacturing the gas sensor.

BACKGROUND

A gas sensor disposed in the exhaust pipe or the like of the internal combustion engine of a vehicle is used to detect the concentration of oxygen, NOx etc., in the exhaust gas flowing in the exhaust pipe. An element body and a sensor element are used in the gas sensor. The element body is provided with a solid electrolyte body, an insulator, a heater, etc., and the sensor element is provided with a protective layer for protecting the element body from water, deleterious substances, etc. The insulator of the element body is formed of a dense ceramic material, and the protective layer is formed of a porous ceramic material.

SUMMARY

One aspect of the present disclosure is a gas sensor having a sensor element that includes an element body, a surface protective layer, and an internal protective layer.

The element body includes a solid electrolyte body provided with at least one pair of electrodes, and an insulator that is laminated on the solid electrolyte body, with a heater embedded in the insulator.

The surface protective layer is exposed to a detection target gas, and is formed at an outermost surface position on a tip portion of the element body, extending in the longitudinal direction of the element body and circumferentially covering the heating element of the heater, with respect to the central axis of the element body.

An internal protective layer is provided between the element body and the surface protective layer, with the internal protective layer having a lower thermal conductivity or a higher average porosity than the surface protective layer.

The internal protective layer includes a first protective layer portion, which is located facing the heater.

At least the base position of the first protective layer portion, in the longitudinal direction, is located closer to the tip end of the element body in the longitudinal direction than is the maximum temperature position of the element body.

Another aspect of the present disclosure is a method of manufacturing a gas sensor that includes a sensor element, where the sensor element includes:
an element body having a solid electrolyte body provided with at least one pair of electrodes, and having an insulator laminated on the solid electrolyte body, with a heater embedded in the insulator,
a surface protective layer provided, exposed to a detection target gas, at an outermost surface position on a tip portion of the element body, extending along the longitudinal direction of the element body and circumferentially covering the heating element of the heater, with respect to the central axis of the element body, and
an internal protective layer provided between the element body and the surface protective layer, and having a lower thermal conductivity or a higher average porosity than the surface protective layer, wherein
the manufacturing method includes:
an arrangement step of arranging a ceramic slurry to form the internal protective layer on the tip surface of the element body, in the longitudinal direction of the element body; and
a film forming step of crushing the ceramic slurry with a film forming plate to obtain a uniform thickness, then curing or drying the ceramic slurry.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
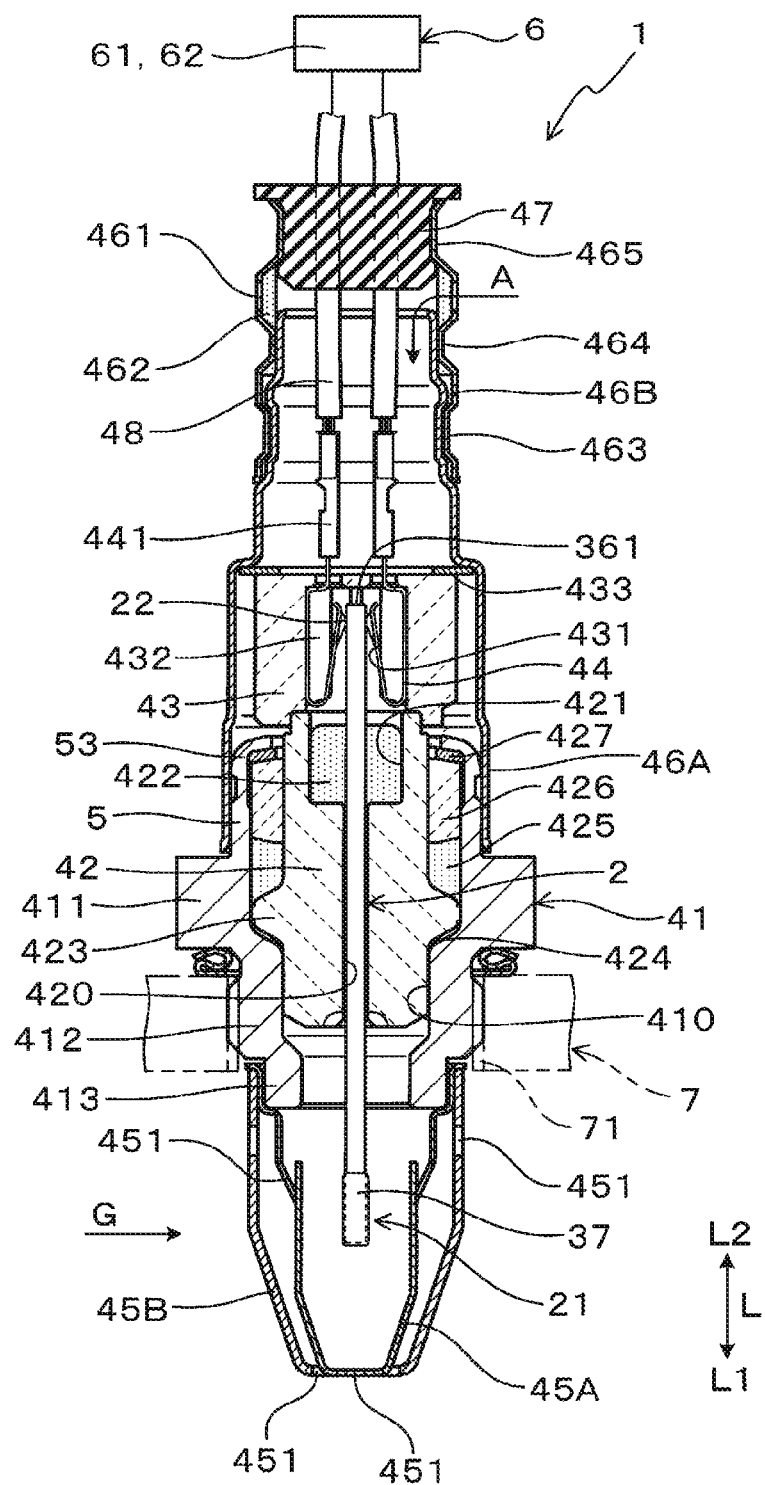
FIG. 1 is an explanatory view showing a cross section of a gas sensor according to an embodiment.

For example, in the gas sensor described in JP 2016-029360, in order to protect the sensor element from water and deleterious substances contained in the gas to be detected, a porous protection layer made of porous ceramic particles is provided on the surface at the tip end of the sensor element, in the longitudinal direction. This porous protective layer has a lower layer formed on the surface of the sensor element, to provide a capability of trapping deleterious substances, and an upper layer formed on the surface of the lower layer for ensuring water repellency. To impart the water repellency, the porosity of the upper layer is made lower than that of the lower layer.

In recent years, gas sensors have been designed with the objectives of reducing the emissions from the internal combustion engine of a vehicle, and of being activated at an early stage and being highly responsive. If the gas sensor is designed to be activated at an early stage, the rate of temperature rise of the sensor element due to energization of the heater tends to become increased. Furthermore, in designing the gas sensor for improved responsiveness, the flow rate of the exhaust gas in contact with the sensor element tends to become increased. As a result, water that is scattered by the exhaust gas tends to come into contact with the sensor element when the sensor element has become heated to a high temperature, thereby increasing the thermal stress applied to the sensor element.

When the heating element of the heater generates heat, the insulator of the sensor element is heated first, and the heat is then transferred from the insulator to the porous protective layer. When this occurs with the sensor element of the gas sensor shown in JP 2016-029360, the lower layer of the porous protective layer becomes an obstacle to heat transfer, due to its high porosity ratio, and it thus becomes difficult for heat to be transferred from the insulator to the upper layer of the porous protective layer. This tends to increase the temperature difference between the insulator and the upper layer of the porous protective layer. Thus, whereas there is a high degree of thermal expansion on the high temperature side of the insulator, the upper layer of the porous protective layer reaches a lower temperature and does not undergo significant thermal expansion. This difference in thermal expansion between the insulator and the upper layer of the porous protective layer can readily result in damage to that upper layer.

As a result of extensive research by the assignees of the present invention, it has been found that, in the element body of the sensor element, the positional relationship between the maximum temperature position and the lower layer of the porous protective layer is important. Here, the maximum temperature position is the position in the element body at which a maximum temperature is reached when the gas sensor is in use. The upper layer of the porous protective layer will be referred to as the surface protective layer, and the lower layer of the porous protective layer referred to as the internal protective layer.

The present disclosure has been derived with the objective of providing a gas sensor in which the surface protective layer is less likely to be damaged due to a difference in thermal expansion, and of providing a method of manufacturing such a gas sensor.

One aspect of the present disclosure is a gas sensor having a sensor element that includes an element body, a surface protective layer, and an internal protective layer.

The element body includes a solid electrolyte body provided with at least one pair of electrodes, and an insulator that is laminated on the solid electrolyte body, with a heater embedded in the insulator.

The surface protective layer is exposed to a detection target gas, and is formed at an outermost surface position on a tip portion of the element body, extending in the longitudinal direction of the element body and circumferentially covering the heating element of the heater, with respect to the central axis of the element body.

An internal protective layer is provided between the element body and the surface protective layer, with the internal protective layer having a lower thermal conductivity or a higher average porosity than the surface protective layer.

The internal protective layer includes a first protective layer portion, which is located facing the heater.

At least the base position of the first protective layer portion, in the longitudinal direction, is located closer to the tip end of the element body in the longitudinal direction than is the maximum temperature position of the element body.

Another aspect of the present disclosure is a method of manufacturing a gas sensor that includes a sensor element, where the sensor element includes:

an element body having a solid electrolyte body provided with at least one pair of electrodes, and having an insulator laminated on the solid electrolyte body, with a heater embedded in the insulator, a surface protective layer provided, exposed to a detection target gas, at an outermost surface position on a tip portion of the element body, extending along the longitudinal direction of the element body and circumferentially covering the heating element of the heater, with respect to the central axis of the element body, and an internal protective layer provided between the element body and the surface protective layer, and having a lower thermal conductivity or a higher average porosity than the surface protective layer, wherein the manufacturing method includes:

an arrangement step of arranging a ceramic slurry to form the internal protective layer on the tip surface of the element body, in the longitudinal direction of the element body; and a film forming step of crushing the ceramic slurry with a film forming plate to obtain a uniform thickness, then curing or drying the ceramic slurry.

(Gas Sensor According to Above Aspect)

In the gas sensor according to the above aspect, in which the element body of the sensor element is provided with two protective layers consisting of an internal protective layer and a surface protective layer, a specific positional relationship is devised between the heating element of the heater and the internal protective layer. Specifically, the internal protective layer includes a first protective layer portion, located on the side facing the heater. At least the base position of the internal protective layer is located closer to the tip end of the element body, in the longitudinal direction, than is the maximum temperature position of the element body in the longitudinal direction. Furthermore, on the side of the sensor element on which the heater is disposed opposite the solid electrolyte body, the insulator of the element body, the internal protective layer and the surface protective layer are disposed overlapping one another at a position which is closer to the tip end of the element body than is the maximum temperature position of the element body. Moreover, the insulator of the element body and the surface protective layer are disposed overlapping one another at a position which is closer to the base end of the element body than is the maximum temperature position of the element body.

Here, the "tip end" in the longitudinal direction of the element body or the sensor element signifies the end that is exposed to the detection target gas. Furthermore, the "base end" in the longitudinal direction of the element body or the sensor element, signifies the end that is opposite the tip end.

When the gas sensor is in use, with the pair of electrodes being controlled to an active temperature by the heat generated by the heating element of the heater, those parts of the insulator and of the internal protective layer and surface protective layer which are located on the side of the sensor element where the heater is disposed will become heated more rapidly than other parts. However, in the case of a gas sensor according to the above aspect, at a position which is on the side of the sensor element where the heater is disposed and which is closer to the base end of the element body than is the maximum temperature position, the internal protective layer is not interposed between the insulator and the surface protective layer. Hence at such a position, heat is transferred directly from the insulator to the surface protective layer. As a result, a temperature difference between the insulator and the surface protective layer is unlikely to arise at such a position, and hence damage to the surface protective layer caused by a difference in thermal expansion is unlikely to occur.

On the other hand, with a gas sensor according to the above aspect, even at a position where heat is transferred from the insulator to the surface protective layer through the internal protective layer, on the side of the sensor element where the heater is disposed, it is found that damage to the surface protective layer is unlikely to occur if the position where the heat transfer occurs is closer to the base end of the sensor element than is the maximum temperature position of the sensor element. Furthermore, at a position on the side of the sensor element where the heater is not disposed, even is heat is transferred from the insulator to the surface protective layer through the internal protective layer, a temperature difference and a resultant difference in thermal expansion between the insulator and the surface protective layer are unlikely to arise, so that damage to the surface protective layer is unlikely to occur.

Hence with a gas sensor according to the above aspect, it is possible to prevent damage to the surface protective layer due to a difference in thermal expansion.

The "maximum temperature position in the longitudinal direction of the element body" can be specified as the heat generation center position, which is the central position of the formation range of the heating element, in the longitudinal direction of the element body. When the gas sensor is in use, the maximum temperature position becomes displaced slightly in the longitudinal direction, from the heat generation center position toward the tip end of the element body, due to the effects of heat shrinkage. In heat shrinkage, heat moves from the tip end of the sensor element to the base end, in the longitudinal direction. From consideration of this, the base position of the first protective layer portion is preferably located closer to the tip end of the element body, in the longitudinal direction, than is the intermediate position between the heat generation center position and the tip position of the heating element.

(Method of Manufacturing Gas Sensor)

The gas sensor manufacturing method described is suitable for manufacturing a gas sensor according to the above aspect. In the method of manufacturing, the internal protective layer can be formed to have as uniform a thickness as possible on the tip surface of the element body, in the longitudinal direction, by performing the arrangement step and the film forming step.

By using the above gas sensor manufacturing method, it is possible to readily manufacture a gas sensor in which the surface protective layer is less likely to be damaged due to a difference in thermal expansion.

A preferred embodiment of the above gas sensor will be described with reference to the drawings. As shown in FIGS. 1 to 4, the gas sensor 1 of this embodiment includes a sensor element 2 for measuring the concentration of oxygen or the like in an exhaust gas G as a detection target gas. The sensor element 2 includes an element body 20, a surface protective layer 37, and an internal protective layer 38.

The element body 20 has a solid electrolyte body 31 provided with at least a pair of electrodes 311, 312, and insulators 33A and 33B which are laminated on the solid electrolyte body 31 and in which a heater 34 is embedded. A surface protective layer 37 is provided on the outermost surface of the element body 20, positioned at a tip portion of the element body 20 in the longitudinal direction L of the element body, exposed to the exhaust gas G. The surface protective layer 37 covers the heating element 341 of the heater 34, around the central axis along the longitudinal direction L of the element body 20. Here, "central axis" refers to a virtual line passing through the center of gravity of a cross section of the element body 20 taken orthogonal to the longitudinal direction L.

Figure 2:
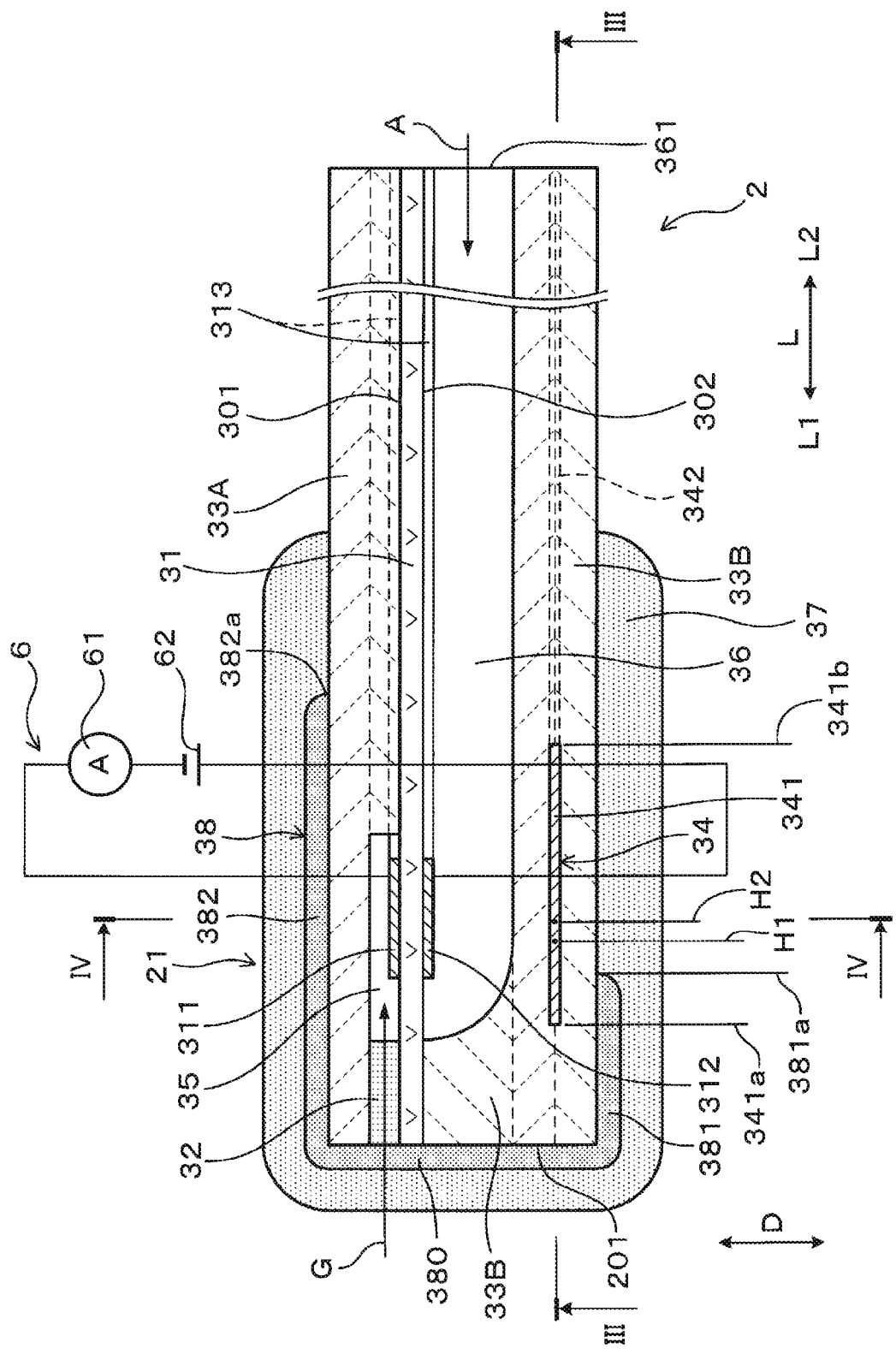
FIG. 2 is an explanatory view showing a cross section of the sensor element of the gas sensor according to the embodiment.
Figure 3:
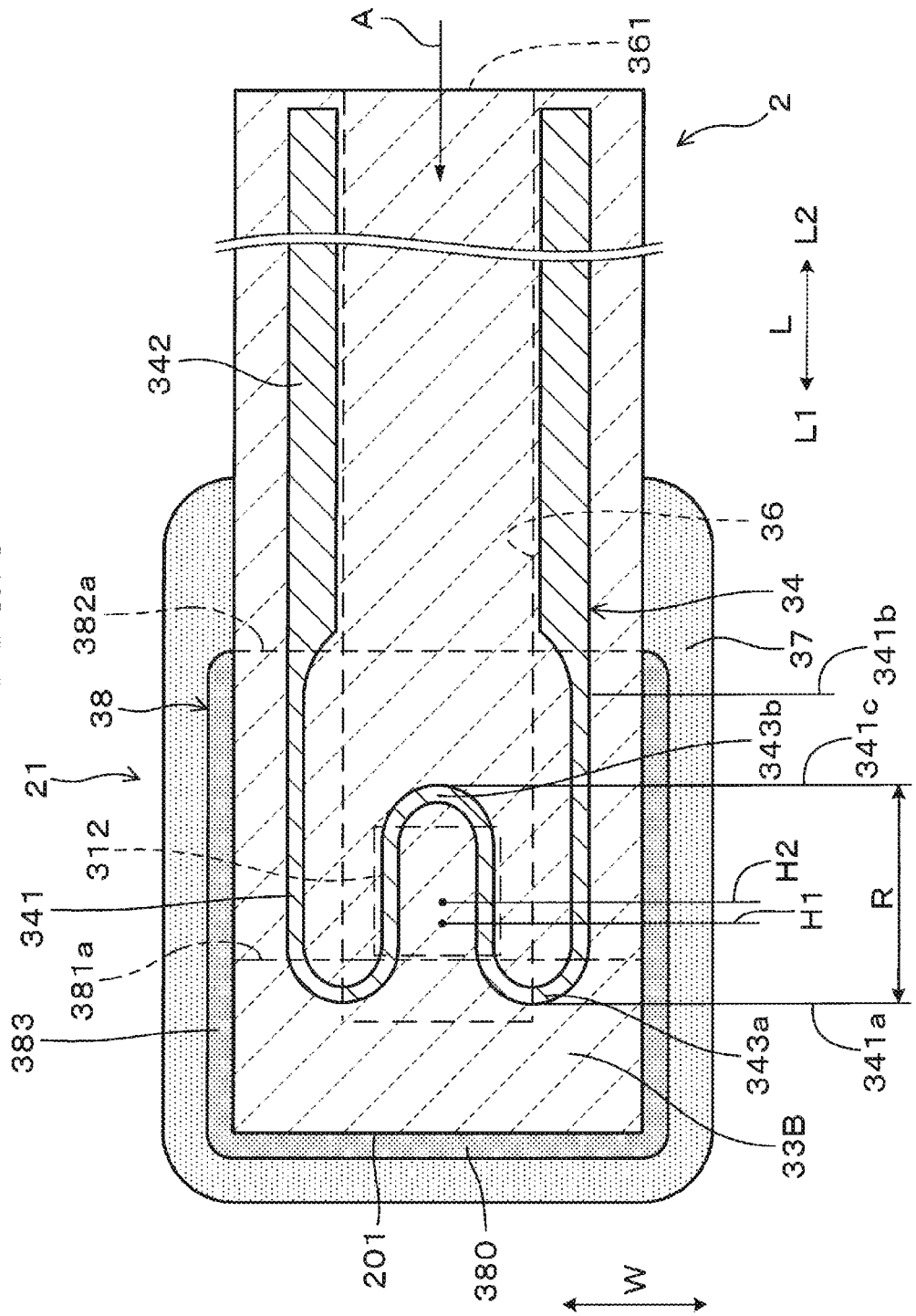
FIG. 3 is an explanatory view according to the embodiment, showing a cross section taken through line III-III of FIG. 2.

As shown in FIGS. 2 and 3, an internal protective layer 38, which has a lower thermal conductivity or higher average porosity than the surface protective layer 37, is provided between the element body 20 and the surface protective layer 37. In the internal protective layer 38, at least the base position 381a in the longitudinal direction L of a first protective layer portion 381, which is located on the opposite side from the heater 34, is positioned closer to the tip end L1 of the element body 20 in the longitudinal direction than is the maximum temperature position H1 of the element body 20.

The gas sensor 1 of this embodiment is described in detail below.

(Gas Sensor 1)

As shown in FIG. 1, the gas sensor 1 is disposed at an attachment port 71 of the exhaust pipe 7 of the internal combustion engine of a vehicle, and serves to detect the concentration of oxygen or the like, as the detection target gas, in the exhaust gas G flowing through the exhaust pipe 7. The gas sensor 1 can be used as an air-fuel ratio sensor (A/F sensor) for obtaining the air-fuel ratio in an internal combustion engine based on the oxygen concentration in the exhaust gas G, the unburned gas concentration, and the like. The air-fuel ratio sensor can quantitatively and continuously detect air/fuel ratios in a range extending from a fuel-rich state in which the ratio of fuel to air is higher than theoretical air-fuel ratio to a fuel lean state in which the ratio of fuel to air is lower than theoretical air-fuel ratio. Other than being used as an air-fuel ratio sensor, the gas sensor 1 can be used in various ways for determining the oxygen concentration.

A catalyst for purifying harmful substances in the exhaust gas G is disposed in the exhaust pipe 7, and the gas sensor 1 can be disposed at either the upstream side or the downstream side of the catalyst, with respect to the flow direction of the exhaust gas G in the exhaust pipe 7. The gas sensor 1 may also be disposed in a pipe on the intake side of a supercharger which uses the exhaust gas G to increase the density of air drawn in by the internal combustion engine. Furthermore, the gas sensor 1 can be disposed in a pipe in an exhaust gas recirculation mechanism that recirculates a part of the exhaust gas G, exhausted from the internal combustion engine to the exhaust pipe 7, to the intake pipe of the internal combustion engine.

(Sensor Element 2)

Figure 4:
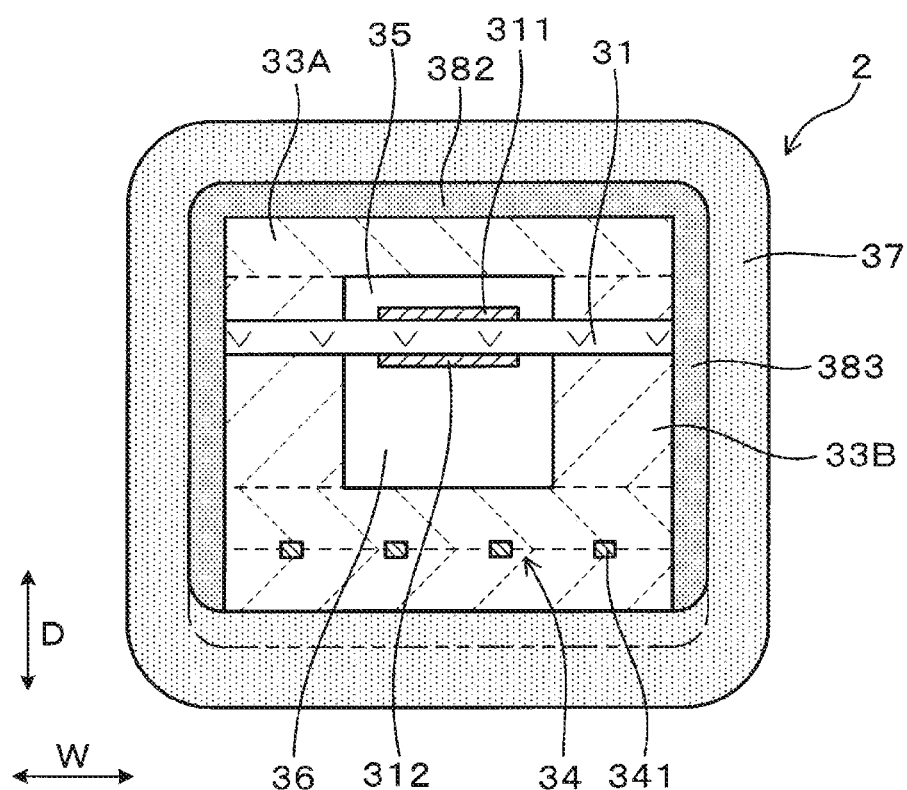
FIG. 4 is an explanatory view according to the embodiment, showing a cross section taken through line IV-IV of FIG. 2.

As shown in FIGS. 2 to 4, the sensor element 2 of this embodiment is formed in an elongated rectangular shape, and has a solid electrolyte body 31, an exhaust electrode 311 and an atmospheric electrode 312, a first insulator 33A, and a second insulator 33B, a gas chamber 35, an atmospheric duct 36, and a heater 34. The sensor element 2 is a laminated type in which the insulators 33A and 33B and the heater 34 are laminated on the solid electrolyte body 31.

In this embodiment, the longitudinal direction L of the sensor element 2 signifies the direction of elongation of the sensor element 2. Furthermore, the direction in which the solid electrolyte body 31 and the insulators 33A and 33B are laminated, that is, the direction in which the solid electrolyte body 31, the insulators 33A and 33B, and the heater 34 are stacked, orthogonal to the longitudinal direction L, is referred to herein as the stacking direction D. Furthermore, the direction orthogonal to the longitudinal direction L and the stacking direction D is referred to as the width direction W. In addition, in the longitudinal direction L of the sensor element 2, the end of the sensor element 2 that is exposed to the exhaust gas G is referred to as the tip end L1, and the end of the sensor element 2 that is opposite the tip end L1 is referred to as the base end L2.

(Solid Electrolyte Body 31, Exhaust Electrode 311 and Atmospheric Electrode 312)

The solid electrolyte body 31 shown in FIGS. 2 to 4 has conductivity for oxygen ions ($O^{2-}$) when at a predetermined active temperature. The first surface 301 of the solid electrolyte body 31 is provided with an exhaust electrode 311 that is exposed to the exhaust gas G, and the second surface 302 of the solid electrolyte body 31 is provided with an atmospheric electrode 312 that is exposed to the atmospheric air A. The exhaust electrode 311 and the atmospheric electrode 312 are disposed in a part of the sensor element 2 near the tip end L1 exposed to the exhaust gas G with respect to in the longitudinal direction L, overlapping one another in the stacking direction D via the solid electrolyte body 31. The exhaust electrode 311, the atmospheric electrode 312, and a portion of the solid electrolyte body 31 that is sandwiched between these electrodes 311 and 312, constitute a detection unit 21, which is located in a part of the sensor element 2 near the tip end L1 with respect to in the longitudinal direction L. The first insulator 33A and the second insulator 33B are respectively laminated on the first surface 301 and the second surface 302 of the solid electrolyte body 31.

The solid electrolyte body 31 is composed of a zirconia-based oxide containing zirconia as a main component (50% by mass or more), consisting of stabilized zirconia, or of partially stabilized zirconia in which a rare earth metal element or an alkaline earth metal element is substituted for part of the zirconia. Part of the zirconia constituting the solid electrolyte body 31 can be replaced by yttria, scandia or calcia.

The exhaust electrode 311 and the atmospheric electrode 312 contain platinum as a noble metal exhibiting catalytic activity for oxygen, and a zirconia oxide as a co-material with the solid electrolyte body 31. The co-material serves to maintain the bonding strength between the solid electrolyte body 31 and the exhaust electrode 311 and atmospheric electrode 312, when the electrode material for forming the exhaust electrode 311 and atmospheric electrode 312 is printed (coated) in a paste-like condition on the solid electrolyte body 31, and the solid electrolyte body 31 and the electrode material are fired.

As shown in FIG. 2 electrode lead portions 313 are connected to the exhaust electrode 311 and the atmospheric electrode 312, for electrically connecting these electrodes to the exterior of the gas sensor 1. The electrode lead portion 313 extends in the longitudinal direction L to a part of the sensor element 2 at the base end L2.

(Gas Chamber 35)

As shown in FIGS. 2 to 4, a gas chamber 35 surrounded by the first insulator 33A and the solid electrolyte body 31 is formed adjacent to the first surface 301 of the solid electrolyte body 31. The gas chamber 35 is formed at a position for accommodating the exhaust electrode 311 at the tip end L1 of the first insulator 33A, in the longitudinal direction L. The gas chamber 35 is formed as a space enclosed by the first insulator 33A, the gas introduction section 32, and the solid electrolyte body 31. The exhaust gas G flowing in the exhaust pipe 7 is introduced into the gas chamber 35 after passing through a gas introduction section 32.

(Gas Introduction Section 32)

As shown in FIG. 2, the gas introduction section 32, which consists of a diffusion resistance section in the present embodiment, is provided adjacent to the tip end L1 of the gas chamber 35 in the longitudinal direction L. Alternatively stated, the gas introduction section 32 is formed on the tip surface 201 of the element body 20 in the longitudinal direction L. The gas introduction section 32 is formed in the first insulator 33A by disposing a porous body consisting of a metal oxide such as aluminum oxide in an introduction port which opens adjacent to the tip end L1 of the gas chamber 35 in the longitudinal direction L. The diffusion rate (flow rate) of the exhaust gas G that is introduced into the gas chamber 35 is limited by the rate at which the exhaust gas G passes through the pores of the porous body in the gas introduction section 32.

It would be equally possible for gas introduction sections 32 to be formed on both of opposite sides of the gas chamber 35, in the width direction W. In that case, the gas introduction sections 32 would be disposed in introduction ports in the first insulator 33A which open adjacent to respective opposite sides of the gas chamber 35 in the width direction W. The gas introduction section 32 can alternatively be formed by using a pinhole consisting of a small through hole that communicates with the gas chamber 35, instead of a porous body.

(Atmospheric Duct 36)

As shown in FIGS. 2 and 3 an atmospheric duct 36, surrounded by the second insulator 33B and the solid electrolyte body 31, is formed adjacent to the second surface 302 of the solid electrolyte body 31. The atmospheric duct 36 is formed from a part of the second insulator 33B in the longitudinal direction L accommodating the atmospheric electrode 312 to a base end part in the longitudinal direction L of the sensor element 2 that is exposed to the atmosphere A. A base end opening 361 is formed as an atmospheric introduction section of the atmospheric duct 36, positioned at the base end of the sensor element 2 in the longitudinal direction L. The atmospheric duct 36 extends from the base end opening 361 to a position where it overlaps the gas chamber 35 in the stacking direction D, via the solid electrolyte body 31. Atmospheric air A is introduced into the atmosphere duct 36 from the base end opening 361.

(Insulators 33A, 33B)

As shown in FIGS. 2 to 4, the first insulator 33A forms the gas chamber 35, while the second insulator 33B forms the atmospheric duct 36 and has the heater 34 embedded therein. The first insulator 33A and the second insulator 33B are formed of a metal oxide such as alumina (aluminum oxide). The insulators 33A and 33B are formed as dense bodies which are impermeable to a gas such as the exhaust gas G or atmospheric air A, being formed with substantially no pores through which a gas can pass.

(Terminals 22 of Sensor Element 2)

At the base end of the sensor element 2 in the longitudinal direction L, as shown in FIGS. 1 and 2, terminals 22 of the sensor element 2 are electrically connected to respective electrode lead portions 313 of the exhaust gas electrode 311 and the atmospheric electrode 312, and to base portions, in the longitudinal direction L, of a pair of heating element lead portions 342, described hereinafter. The terminals 22 are disposed on both side surfaces of a base end portion of the sensor element 2, in the longitudinal direction L. The base end portions of the electrode lead portions 313 and the heating element lead portions 342 in the longitudinal direction L are connected to the terminals 22 via through holes that are formed in the insulators 33A and 33B.

(Other Configuration Features of Sensor Element 2)

Figure 5:
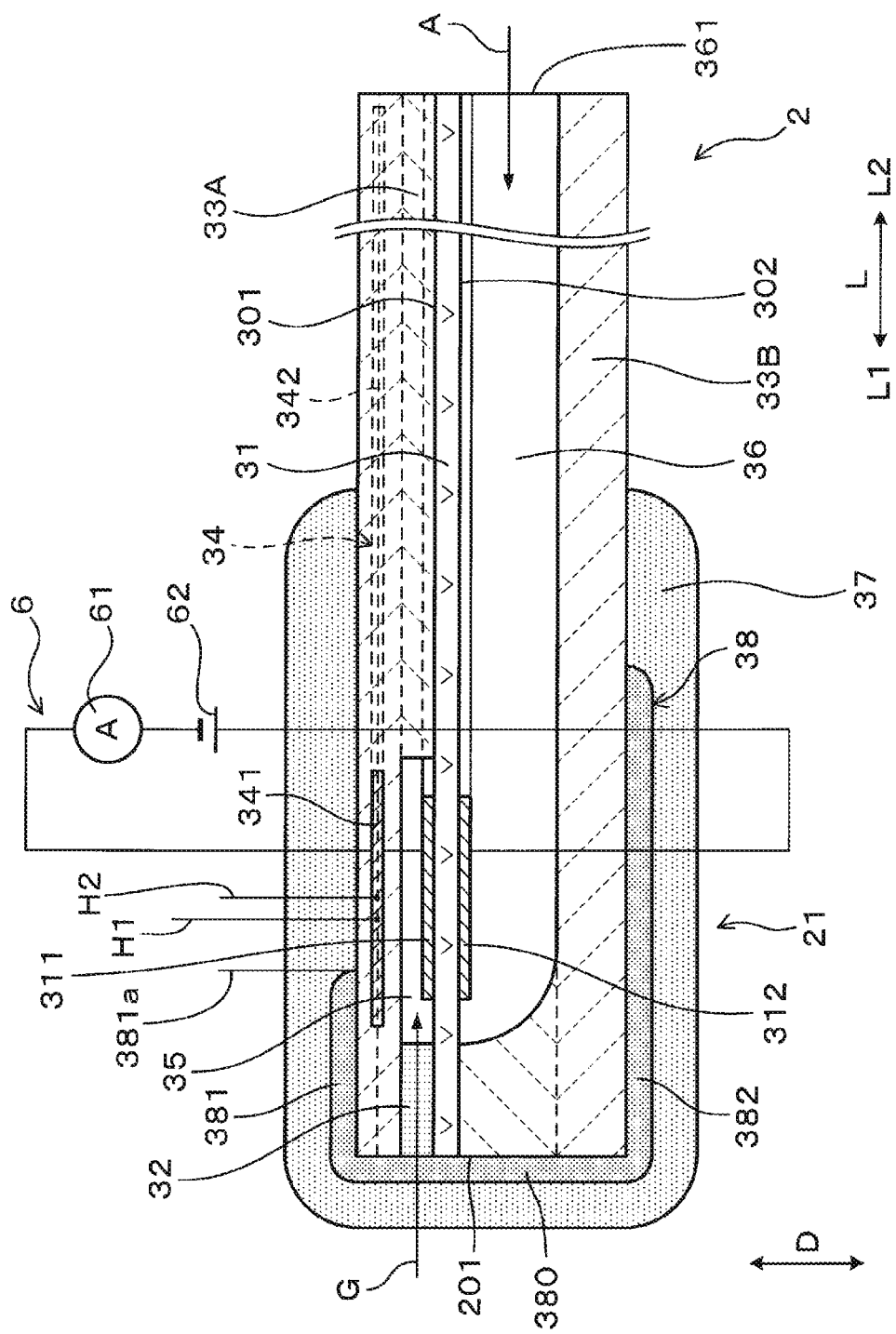
FIG. 5 is an explanatory view illustrating another sensor element according to the embodiment, corresponding to a cross section taken through line III-III of FIG. 2.

In the sensor element 2 of this embodiment, as shown in FIG. 2, the heater 34 is embedded in the second insulator 33B, which is formed facing the solid electrolyte body 31 via the atmospheric duct 36. A first protective layer portion 381 of an internal protective layer 38 is formed at a position facing the second insulator 33B. As shown in FIG. 5, it would be equally possible for the heater 34 to be embedded in the first insulator 33A, on the side where the gas chamber 35, formed such as to be opposite the solid electrolyte body 31 in the sensor element 2. In that case, the first protective layer portion 381 of the internal protective layer 38 would be formed at a position facing the first insulator 33A.

Although not shown, the sensor element 2 is not limited to having a single solid electrolyte body 31, and may have two or more solid electrolyte bodes 31. The electrodes 311, 312 provided on the solid electrolyte body 31 are not limited to the pair consisting of the exhaust electrodes 311 and the atmospheric electrode 312, and may be a plurality of sets of electrodes. When a plurality of sets of electrodes are provided on one or a plurality of solid electrolyte bodies 31, respective heating elements 341 of heaters 34 can be provided at positions facing the sets of electrodes.

(Heater 34)

As shown in FIGS. 2 to 4, the heater 34 is embedded in the second insulator 33B which forms the atmospheric duct 36, with the heater 34 including a heating element 341 which generate heats by energization, and heating element lead portions 342 which are connected at the base end L2 of the heating element 341, in the longitudinal direction L. The heating element 341 is disposed at a position where at least a part thereof overlaps the exhaust electrode 311 and the atmospheric electrode 312 in the stacking direction D of the solid electrolyte body 31 and the insulators 33A and 33B.

The heating element 341 is formed of a linear conductor having a meandering shape, consisting of straight portions and a curved portion. The straight portions of the heating element 341 of this embodiment are formed parallel to the longitudinal direction L. The heating element lead portions 342 consist of parallel linear conductor portions, oriented in the longitudinal direction L. The heating element lead portions 342 extend from the heating element 341, in the longitudinal direction L, to a location at the base end L2. The heater 34 contains a conductive metal material.

As shown in FIG. 3, the heating element 341 is formed at the tip end L1 of the heater 34, in a shape that meanders in the longitudinal direction L. The formation range R of the heating element 341, in the longitudinal direction L, can be defined as the range in which the meandering shape is formed by the conductor. The formation range R of the heating element 341 of the present embodiment is the range between the tip position 341a of the conductor portion 343a constituting the tip portion of the heating element 341 with respect to longitudinal direction L, and the base position 341c of the conductor portion 343b of the heating element 341. The formation range R is centrally located in the sensor element 2 in the width direction W.

Figure 6:
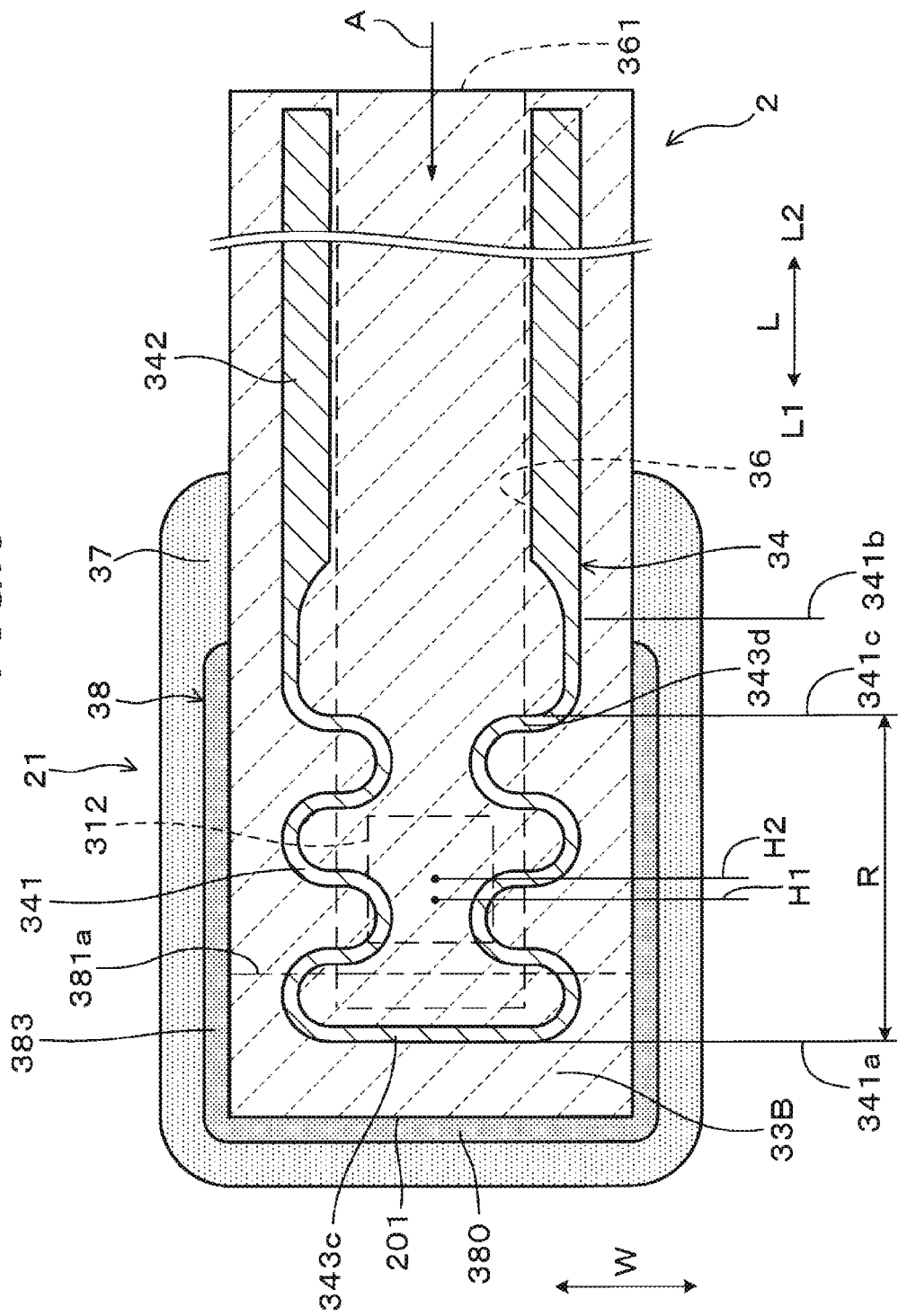
FIG. 6 is an explanatory view illustrating another sensor element according to the embodiment, corresponding to a cross section taken through line IV-IV of FIG. 2.

As shown in FIG. 6, it would be equally possible for the heating element 341 to formed in a shape that meanders in the width direction W. In that case, the formation range R of the heating element 341 is the range between the tip position 341a of the conductor portion 343c in the longitudinal direction L constituting the tip portion of the heating element 341, and the base position 341c of the conductor portion 343d in the longitudinal direction L which constitutes the base portion of the meandering portion of the heating element 341.

The heating element 341 is disposed opposite the exhaust electrode 311 and the atmospheric electrode 312 with respect to the stacking direction D, orthogonal to the longitudinal direction L. In other words, the heating element 341 is disposed in a location at the tip end L1 of the sensor element 2, in the longitudinal direction L, overlapping the exhaust electrode 311 and the atmospheric electrode 312 in the stacking direction D.

The cross-sectional area of the heating element 341 is smaller than that of a heating element lead portion 342, and the resistance value per unit length of the heating element 341 is higher than that of a heating element lead portion 342. Here, "cross-sectional area" signifies the cross-sectional area as measured orthogonal to the extension direction of the heating element 341 and the heating element lead portion 342. When a voltage is applied to the pair of heating element lead units 342, the heating unit 341 generates heat due to Joule heating, thereby heating the periphery of the detection unit 21 to a target temperature. When the gas sensor 1 is in use, the temperature of the exhaust electrode 311 and the atmospheric electrode 312 can be controlled to be within the range 400 to 700° C. by the heat generated by the heating element 341.

(Maximum Temperature Position H1)

As shown in FIGS. 2 and 3, the heat generation center position H2 of the heating element 341 in the heating element 341, in the longitudinal direction L, is the center position, in the longitudinal direction L. of the formation range R of the heating element 341 in the second insulator 33B, in which the heating element 341 is embedded. The heat generation center position H2 is the position, in the longitudinal direction L, where the temperature of the second insulator 33B in which the heating element 341 is embedded reaches its highest value at the time when the heater 34 is energized and the heating element 341 generates heat.

When the gas sensor 1 is in use, the portion of the solid electrolyte body 31 sandwiched between the pair of electrodes 311, 312 is controlled to remain at the active temperature, as the target temperature, by the heat generated from the heating element 341. In this condition, heat is transferred from the tip end L1 toward the base end L2 of the sensor element 2, in the longitudinal direction L. In other words, when the gas sensor 1 is in use, the temperature becomes a maximum near the heat generation center position H2, but a temperature gradient is created whereby the temperature decreases from the tip end L1 to the base end L2 of the sensor element 2, in the longitudinal direction L. Heat shrinkage thus occurs, whereby the heat of the tip end L1 portion of the sensor element 2 tends to move to the base end L2.

Due to this heat shrinkage that occurs in the sensor element 2 when the gas sensor 1 is in use, the maximum temperature position H1, in the longitudinal direction L of the element body 20, becomes slightly shifted from the heat generation center position H2 of the heating element 341 toward the tip end L1. From consideration of this, the base position 381a of the first protective layer portion 381, in the longitudinal direction L, is preferably shifted in the longitudinal direction L to a position that is closer to the tip end L1 than a position midway between the heat generation center position H2 and the tip position 341a of the heating element 341. The tip position 341a of the heating element 341 in the longitudinal direction L is located separated from the tip position of the element body 20 by a predetermined distance, i.e., a predetermined distance from the tip position toward the base end L2 of the element body 20 in the longitudinal direction L.

(Surface Protective Layer 37 and Internal Protective Layer 38)

As shown in FIG. 1, the surface protective layer 37 and the internal protective layer 38 are composed of a plurality of ceramic particles bonded together as a porous ceramic material. Pores (voids) through which the exhaust gas G can pass are formed in the ceramic particles. Fine pores are formed within the ceramic particles constituting the internal protective layer 38. On the other hand, almost no pores are formed in the ceramic particles constituting the surface protective layer 37.

The ceramic particles (metal oxide particles) constituting the surface protective layer 37 consist of α-aluminum oxide (trigonal aluminum oxide (alumina), $Al_2O_3$). The ceramic particles (metal oxide particles) constituting the internal protective layer 38 consist of θ-aluminum oxide or γ-aluminum oxide.

The specific surface area of A-aluminum oxide, signifying the surface area per unit mass (volume), is small, and there are few pores in the ceramic particles. The surface protective layer 37 has the property of becoming water-repellent when the sensor element 2 is heated to a predetermined temperature during use of the gas sensor 1. The water-repellent capability of the surface protective layer 37 protects the sensor element 2 from thermal stress that is generated when the sensor element 2 is exposed to water.

O-aluminum oxide or γ-aluminum oxide has a larger specific surface area, and more pores in the ceramic particles, than α-aluminum oxide. The internal protective layer 38 has a poisoning protection capability which protects the exhaust electrode 311 from poisoning, when exposed to the exhaust gas G as the detection target gas during use of the gas sensor 1. Deleterious substances that can poison the exhaust electrode 311 become captured in the pores in the internal protective layer 38.

When heated to a high temperature, alumina hydrate, which is the raw material for each of the protective layers 37 and 38, becomes stable as high temperature α-aluminum oxide by passing through intermediate compounds such as γ-aluminum oxide and θ-aluminum oxide. Since grain growth occurs in the α-aluminum oxide during the α transition, the specific surface area becomes small.

(Average Porosity)

The average porosity of the internal protective layer 38 is higher than that of the surface protective layer 37. Both the surface protective layer 37 and the internal protective layer 38 are made of aluminum oxide, with thermal conductivity of the internal protective layer 38 being lower than that of the surface protective layer 37. Here, "porosity" refers to the volume occupied by the pores (gas) per unit volume of the surface protective layer 37 and the internal protective layer 38. Various methods are available for measuring the average porosity. For example, the cut surface obtained by cutting the surface protective layer 37 or the internal protective layer 38 can be observed with a scanning electron microscope (SEM), the average of the areas of pores contained per unit area at each of a plurality of locations on the cut surface or on a plurality of cut surfaces can be observed, and the obtained average value taken as the average porosity.

The average porosity can also be obtained by the mercury porosity method or the mass porosity method. In the mercury porosity method, the apparent volume (bulk volume) of a sample obtained by cutting out a part of the surface protective layer 37 or the internal protective layer 38 is measured, and mercury is injected under pressure into the pores of the sample. The porosity is then obtained from the ratio of the volume of mercury pressed into the pores to the apparent volume of the sample. The porosity P is obtained as $P=Vt/Vb \times 100$ [%], where Vb is the apparent volume of the sample and Vt is the volume of the pressure-injected mercury. The average value of the porosities of a plurality of samples, such as 10 samples, can be used as the average porosity.

In the mass porosity method, the dry mass and apparent volume of a sample obtained by cutting out a part of the surface protective layer 37 or the internal protective layer 38 are measured. The dry mass is then divided by the apparent volume to obtain the apparent density (bulk density). In addition, the sample is crushed into particles that do not contain pores, and the true density of the particulate sample is determined. The porosity is then calculated based on the ratio of the bulk density to the true density. Designating W as the dry mass of the particulate sample, V as the apparent volume of the sample, and ρ0 as the true density of the sample, the porosity P is obtained as $$P=1-\rho/\rho0)$$

where ρ (=W/V) is the apparent density of the sample.

The average value of the porosities of a plurality of samples, such as 10 samples, can be used as the average porosity.

The average porosity of the surface protective layer 37 and of the internal protective layer 38 is higher than the average porosity of the porous body in the gas introduction section 32. The exhaust gas G passes through the surface protective layer 37, the internal protective layer 38, and the gas introduction section 32 in that order, to be introduced into the gas chamber 35. The flow rate of the exhaust gas G that can pass through the gas introduction section 32 is smaller than the flow rate of the exhaust gas G that can pass through the surface protection layer 37 and the internal protection layer 38 into the gas chamber 35. Hence the flow of the exhaust gas G into the gas chamber 35 is controlled by the gas introduction section 32.

(Positional Relationship Between Heating Element 341 and Internal Protective Layer 38)

As shown in FIGS. 1 and 2, in the sensor element 2 of the present embodiment, the first protective layer portion 381, which is a portion of the internal protective layer 38 located on the side facing the heater 34, is formed, as far as possible, such as not to overlap the heating element 341 in the stacking direction D. On the other hand, the second protective layer portion 382 of the internal protective layer 38, located on the opposite side from the first protective layer portion 381, is formed such as to overlap the heating element 341 in the stacking direction D. Furthermore, in the internal protective layer 38, the third protective layer portion 383, which is a portion other than the first protective layer portion 381 and the second protective layer portion 382, is formed such as to overlap the heating element 341 in the width direction W. In addition, the tip end protective layer portion 380 of the internal protective layer 38 is formed on the tip end surface 201 of the element body 20, in the longitudinal direction L, such as to cover the gas introduction section 32.

As described above, the gas chamber 35, which contains the exhaust electrode 311 and into which the exhaust gas G is drawn, is formed on the inner surface of the first insulator 33A of the sensor element 2, facing the solid electrolyte body 31. The gas introduction section 32, formed at the tip position of the first insulator 33A in the longitudinal direction L, communicates with the gas chamber 35 and introduces the exhaust gas G into the gas chamber 35. Even if the location in which the first protective layer portion 381 of the internal protective layer 38 is formed is made small, the internal protective layer 38 covers the gas introduction section 32 on the tip surface 201 of the element body 20 in the longitudinal direction L. Deleterious substances contained in the exhaust gas G can thereby be captured by the internal protective layer 38.

If the gas introduction section 32 is formed on a side surface of the element body 20, it is preferable for a portion of the internal protective layer 38 to be formed at a location covering the gas introduction section 32. In that case the gas introduction section 32 would be covered with a third protective layer portion 383, located on a side surface, i.e., other than that of the side where the heater 34 faces the solid electrolyte body 31.

As shown in FIGS. 2 and 3, the base position 381a of the first protective layer portion 381 in the internal protective layer 38, in the longitudinal direction L, is located closer to the tip end L1 of the element body 20, in the longitudinal direction L, than the maximum temperature position H1. More specifically, the first protective layer portion 381 is formed such as to face a portion of the heating element 341 which is at the tip end L1 thereof. In other words, the base position 381a of the first protective layer portion 381, in the longitudinal direction L, is positioned closer to the tip end L1 of the element body 20 than the maximum temperature position H1, and closer to the base end L2 than the tip position 341a of the heating element 341, in the longitudinal direction L. In that case, a temperature difference is unlikely to occur between the second insulator 33B of the sensor element 2 and the surface protective layer 37, at the end of the sensor element 2 where the heater 34 faces and overlaps with the solid electrolyte body 31.

Figure 7:
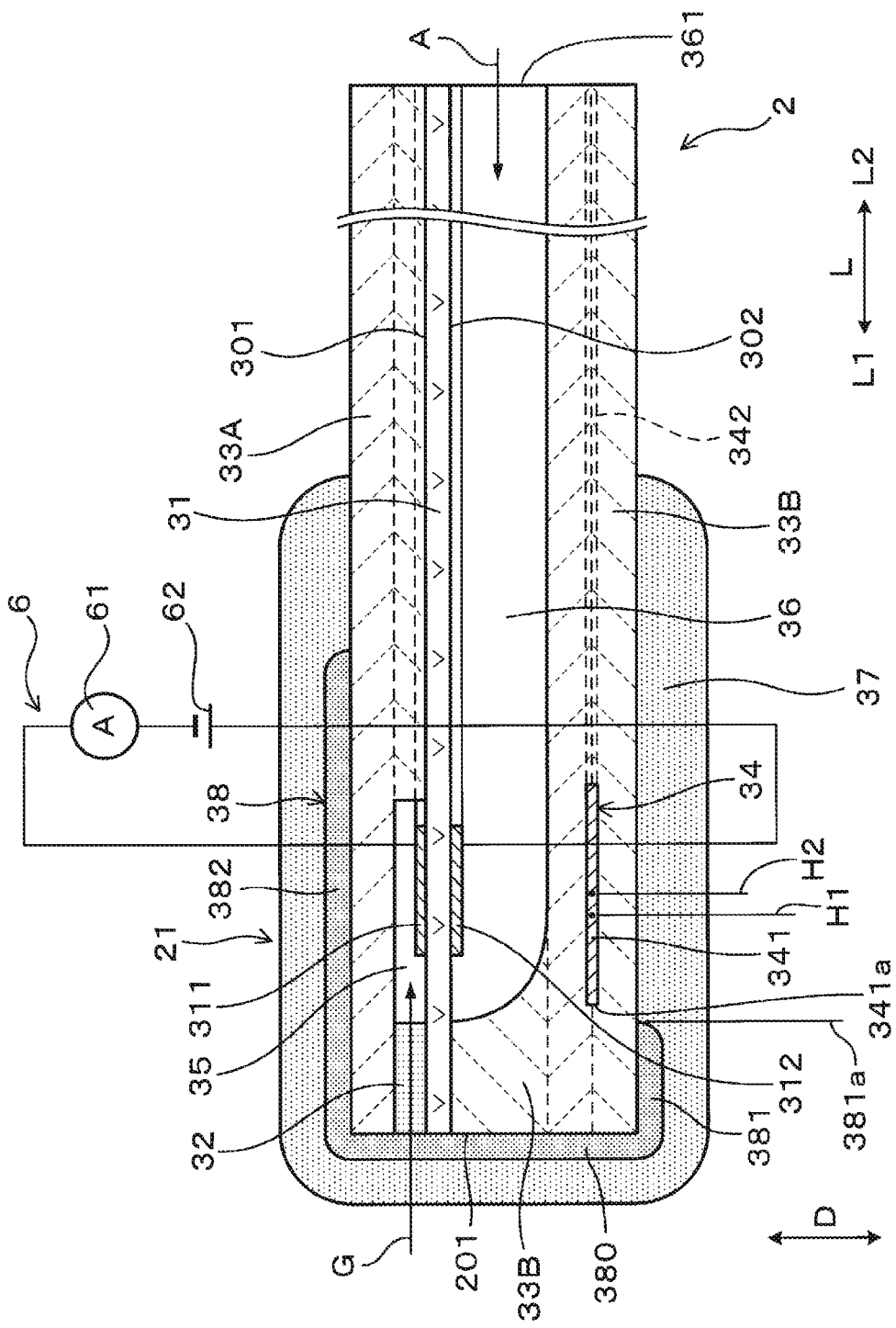
FIG. 7 is an explanatory view illustrating another sensor element according to the embodiment, corresponding to a cross section taken through line III-III of FIG. 2.

It would be equally possible, as shown in FIG. 7, for the first protective layer portion 381 to be formed on the side surface of the element body 20, positioned at the tip end L1 in the longitudinal direction L, such as not to overlap the heating element 341 with respect to the stacking direction D. In that case, the base position 381a of the first protective layer portion 381 is positioned closer to the tip end L1 than the tip position 341a of the heating element 341, in the longitudinal direction L. In that case also, a temperature difference is unlikely to occur between the second insulator 33B of the sensor element 2 and the surface protective layer 37, at the end of the sensor element 2 where the heater 34 faces and overlaps with the solid electrolyte body 31.

As shown in FIG. 2, in the sensor element 2 of the present embodiment, the second protective layer portion 382 of the internal protective layer 38 is formed on a side surface of the element body 20 at a location extending from the tip end thereof, and facing the entire heating element 341. In that case, the base position 382a of the second protective layer portion 382 is located closer to the base end L2, in the longitudinal direction L, than the maximum temperature position H1 of the element body 20. Furthermore, the base position 382a of the second protective layer portion 382 is located closer to the base end L2, in the longitudinal direction L, than the base position 341b of the heating element 341.

Since the second protective layer portion 382 is formed at a position facing the heating element 341, when the gas sensor 1 is in use and the heating element 341 of the heater 34 generates heat, the second protective layer portion 382 acts as an insulating layer, which prevents the escape of heat that is transferred from the heating element 341 in the stacking direction D. Similarly, when as shown in FIG. 3 the third protective layer portion 383 is formed at a position facing the heating element 341, when the gas sensor 1 is in use and the heating element 341 of the heater 34 generates heat, the third protective layer portion 383 too can act as an insulating layer that prevents the escape of heats transferred from the heating element 341 in the stacking direction D.

(Other Positional Relationship Between the Heating Element 341 and the Internal Protective Layer 38)

Figure 8:
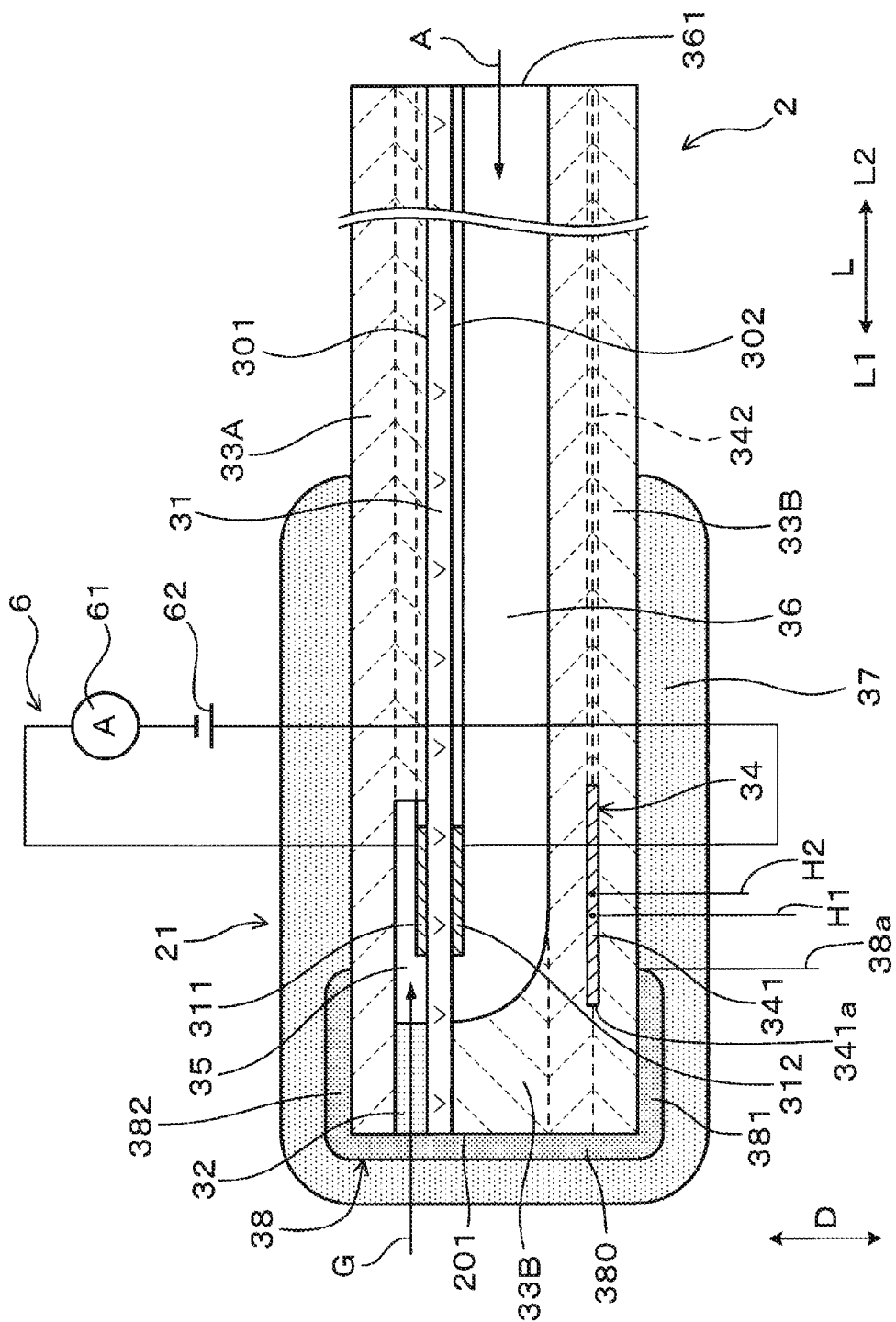
FIG. 8 is an explanatory view illustrating another sensor element according to the embodiment, corresponding to a cross section taken through line III-III of FIG. 2.

As shown in FIG. 8, it would be possible for the internal protective layer 38 to be formed only in a range that extends closer to the tip end L1, in the longitudinal direction L, than the maximum temperature position H1 of the element body 20. In that case the base position 38a of the internal protective layer 38, in the longitudinal direction L, is located closer to the tip end L1 than the maximum temperature position H1 of the element body 20. In that case also, the tip protective layer portion 380 of the internal protective layer 38 is formed on the tip surface 201 of the element body 20, in the longitudinal direction L. In that case moreover, the formation range of the internal protective layer 38 is reduced, making it easier to form the internal protective layer 38 on the element body 20.

Figure 9:
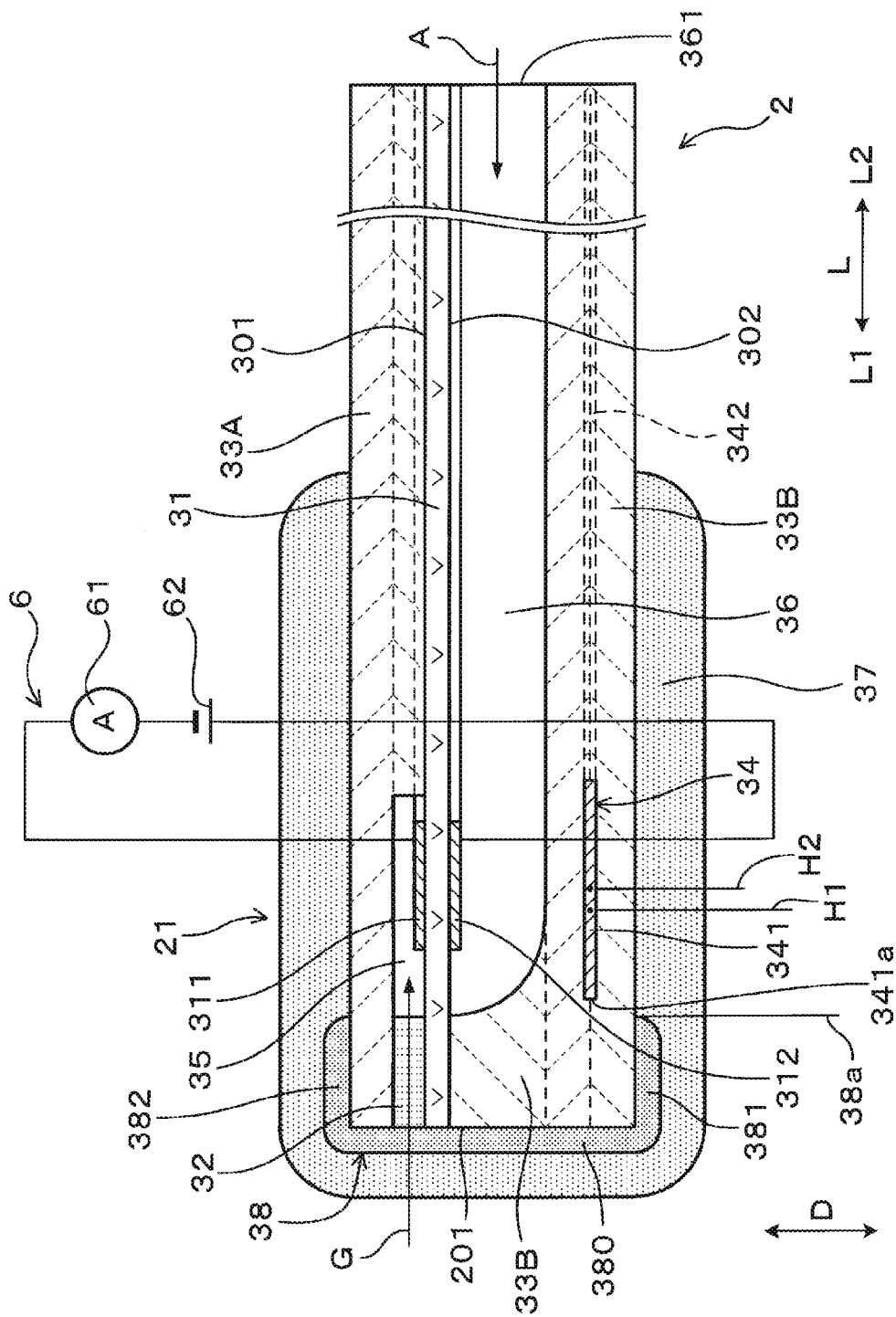
FIG. 9 is an explanatory view illustrating another sensor element according to the embodiment, corresponding to a cross section taken through line III-III of FIG. 2.
Figure 10:
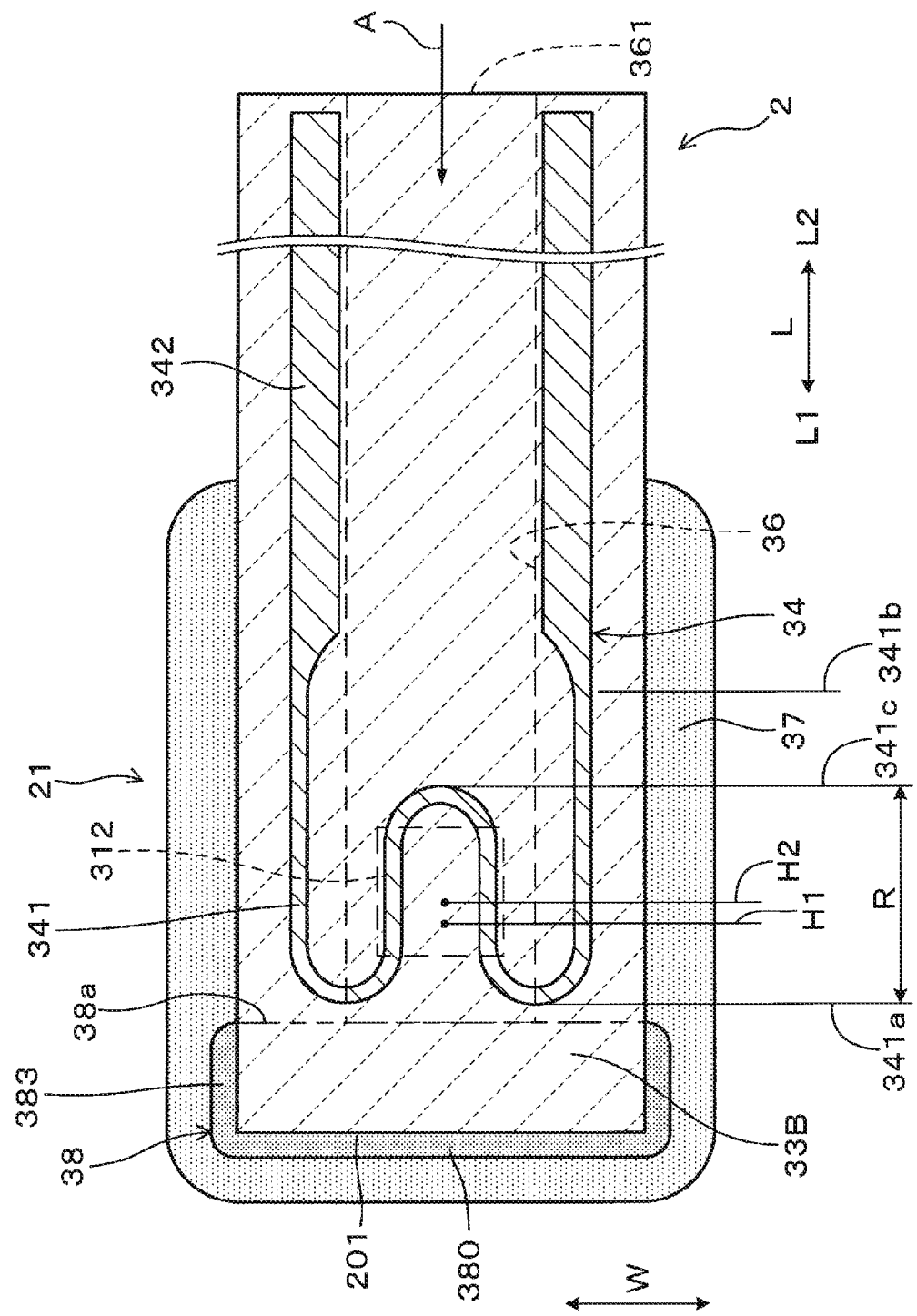
FIG. 10 is an explanatory view illustrating another sensor element of a gas sensor according to the embodiment, corresponding to a cross section taken through line IV-IV of FIG. 2.

As a further alternative, as shown in FIGS. 9 and 10, the internal protective laver 38 can be formed at the tip end L1 such that the portions of the internal protective layer 38 on the side surfaces of the element body 20, around the entire circumference of the element body 20, do not overlap the heating element 341 in the stacking direction D. In that case, the base position 38a of the internal protective layer 38 is located closer to the tip end L1 than the tip position 341a of the heating element 341, in the longitudinal direction L. The internal protective layer 38 can thereby be formed more easily.

(Housing 41)

The housing 41 is used to tightly fasten the gas sensor 1 in an attachment hole 71 of the exhaust pipe 7, as shown in FIG. 1. The housing 41 includes a flange portion 411 constituting the largest outer diameter portion, a tip end tubular portion 412 formed on the tip end L1 of the flange portion 411 and a base end tubular portion 413 formed on the base end L2 of the flange portion 411, in the longitudinal direction L. A male screw thread, to be tightened in a female screw thread of the mounting hole 71, is formed on the outer periphery of the tip end tubular portion 412 at the base end L2 of that portion.

(Base End Covers 46A, 46B)

As shown in FIG. 1, base end covers 46A and 46B cover a wiring portion located at the base end L2 of the gas sensor 1, with respect to in the longitudinal direction L, to protect the wiring portion from water or the like in the atmospheric air A. The parts of the wiring portion electrically connected to the sensor element 2 consist of contact terminals 44, a connection portion (connection fitting 441) between the contact terminals 44 and the lead wires 48, etc.

The base end covers 46A and 46B are formed divided into two parts, which sandwich a water exclusion filter 462 for preventing water in the atmospheric air A from entering the gas sensor 1. Specifically, with the present embodiment, the first base end cover 46A is mounted on the outer periphery of an annular protrusion 5 of the housing 41, and the second base end cover 46B is mounted on the outer periphery at the base end L2 of the first base end cover 46A, in the longitudinal direction L. A portion of the second base end cover 46B, at the tip end L1 thereof in the longitudinal direction L, is attached to the outer periphery of a portion of the first base end cover 46A, at the base end L2 of the first base end cover 46A with respect to in the longitudinal direction L.

A sealing member 47 which retains a plurality of lead wires 48 is held on the inner peripheral side of a portion of the second base end cover 46B, at the base end L2 of the second base end cover 46B in the longitudinal direction L. The water repellent filter 462 is sandwiched between the first base end cover 46A and the second base end cover 46B, and between the second base end cover 46B and a sealing member 47.

The second base end cover 46B has an air introduction hole 461 formed therein, for introducing atmospheric air A from the exterior of the gas sensor 1. The water repellent filter 462 is disposed such as to cover the air introduction hole 461 from the inner peripheral side of the second base end cover 46B. The base end opening 361 of the atmospheric duct 36 in the sensor element 2 is open to the space within the base end covers 46A and 46B. The atmospheric air A around the atmosphere introduction hole 461 of the second base end cover 46B is taken into the base end covers 46A and 46B via the water exclusion filter 462. The atmospheric air A that has passed through the water exclusion filter 462 flows into the atmosphere duct 36 of the sensor element 2 from the base end opening 361 of the atmosphere duct 36, and is directed to the atmosphere electrode 312 in the atmosphere duct 36.

(First Insulator 42)

As shown in FIG. 1, a first insulator 42 is disposed in a center hole 410 which penetrates the central portion of the housing 41 in the longitudinal direction L. The first insulator 42 is made of an insulating ceramic material. A first insertion hole 420, penetrating in the longitudinal direction L, is formed at the center of the first insulator 42, into which the sensor element 2 is inserted. A fixing recess 421, containing glass powder 422 for fixing the sensor element 2, is formed at base end L2 of the first insertion hole 420 in the longitudinal direction L. When in the condition of being inserted into the first insertion hole 420 of the first insulator 42, the sensor element 2 is fixed to the first insulator 42 by the glass powder 422 in the fixing recess 421.

A protrusion 423 constituting the maximum outer diameter portion of the first insulator 42 is formed on the outer periphery of the first insulator 42. With the first insulator 42 in the condition of being disposed in the center hole 410 of the housing 41, a sealing material 424 is disposed in the center hole 410 at the tip end L1 of the protrusion 423 in the longitudinal direction L. and caulking materials 425, 426, 427 are disposed in the center hole 410 at the base end L2 of the protrusion 423 in the longitudinal direction L. The caulking materials 425, 426, 427 consist of a powder sealing material 425, a tubular body 426, and a caulking material 427. By bending a caulking portion 53 of the annular protrusion 5 of the housing 41 toward the inner peripheral side in the radial direction R, the first insulator 42 becomes caulked and fixed in the center hole 410 of the housing 41 by the sealing material 424 and the caulking materials 425, 426, 427.

(Second Insulator 43)

As shown in FIG. 1, the second insulator 43 is disposed at the base end L2 of the first insulator 42 in the longitudinal direction L. and retains the contact terminals 44 that contact the terminals 22 of the sensor element 2. The second insulator 43 is made of an insulating ceramic material. A second insertion hole 430, through which the sensor element 2 is inserted, is formed at the center of the second insulator 43, penetrating in the longitudinal direction L. Grooves 432 for arranging the contact terminals 44 are formed in the second insulator 43, positioned to communicate with the second insertion hole 430, The second insulator 43 is disposed on the inner peripheral side of the base end cover 46A, with respect to the radial direction R. The second insulator 43 is pressed against the first insulator 42 by the first base end cover 46A, acting via a leaf spring 433.

(Contact Terminals 44)

As shown in FIG. 1, the contact terminals 44 contact the terminals 22 of the sensor element 2, electrically connecting the terminals 22 to the lead wires 48. The contact terminals 44 are disposed in the grooves 432 of the second insulator 43. The contact terminals 44 are connected to the lead wires 48 via connection fittings 441, and are held in contact with the terminals 22 by applying a restoring force of elastic deformation. A plurality of contact terminals 44 are disposed, in accordance with the number of terminals 22 in the sensor element 2, in other words, in accordance with the number of electrode lead portions 313 of the exhaust electrode 311 and the atmospheric electrode 312 and the number of pairs of heating element lead portions 342.

(Sealing Member 47 and Lead Wires 48)

As shown in FIG. 1, a sealing member (bush) 47 is disposed on the inner peripheral side of the second base end cover 46B, and retains the plurality of lead wires 48 in a sealed condition. The sealing member 47 is made of an elastically deformable rubber material, functioning as a sealing material. The sealing member 47 is formed with through holes, through which the lead wires 48 are inserted. The gaps between the lead wires 48 and the through holes, and between the sealing member 47 and the second base end cover 46B, are sealed by crimping the second base end cover 46B to the sealing member 47. The lead wires 48 serve to connect the contact terminals 44 to an external sensor control device 6 of the gas sensor 1. Each lead wire 48 has an internal conductor covered with a coating layer.

(Tip End Covers 45A, 45B)

As shown in FIG. 1, the front end covers 45A and 45B cover the detection unit 21 of the sensor element 2, which protrudes in the longitudinal direction L of the housing 41 from the surface at the tip end L1 of the sensor element 2. The tip end covers 45A and 45B are attached to the outer periphery of the base end cylinder portion 413, which is formed in the tip end cylinder portion 412 of the housing 41. The tip end covers 45A and 45B of this embodiment have a double structure of a first tip end cover 45A and a second tip end cover 45B that covers the first tip end cover 45A. Gas flow holes 451 through which exhaust gas G can flow are formed in the first front end cover 45A and the second front end cover 45B.

The detection unit 21 of the sensor element 2 and the front end covers 45A and 45B are disposed in the exhaust pipe 7 of an internal combustion engine. A part of the exhaust gas G flowing in the exhaust pipe 7 passes into the tip end covers 45A and 45B through the gas flow holes 451. The exhaust gas G in the front end covers 45A and 45B then passes through the protective layers 37 and 38 of the sensor element 2 and the gas introduction section 32 and is directed to the exhaust electrode 311. It should be noted that it would be equally possible for the front end covers 45A and 45B to be formed as a single structure in which gas flow holes 451 are formed.

(Sensor Control Device 6)

As shown in FIG. 1, the lead wires 48 in the gas sensor 1 are electrically connected to a sensor control device 6, which controls gas detection by the gas sensor 1. The sensor control device 6 performs electrical control of the gas sensor 1 in cooperation with an engine control device which controls combustion operations in the engine. As shown in FIG. 2, the sensor control device 6 is configured with a current measuring circuit 61 for measuring the current flowing between the exhaust electrode 311 and the atmospheric electrode 312, a voltage application circuit 62 that applies a voltage between the exhaust electrode 311 and the atmospheric electrode 312, and an energization circuit or the like for energizing the heater 34. It should be noted that the sensor control device 6 could be built into the engine control device (Other Forms of Gas Sensor 1)

It would be equally possible for the gas sensor 1 to be configured to detect the concentration of a specific gas component such as NOx (nitrogen oxide). In such a NOx sensor, a pump electrode would be disposed in contact with the exhaust electrode 311 on the solid electrolyte body 31, on the upstream side of the flow of the exhaust gas G. Oxygen is pumped to the atmospheric electrode 312 by applying a voltage to the pump electrode. The atmospheric electrode 312 could be formed at a position where it overlaps the pump electrode in the stacking direction D, via the solid electrolyte body 31.

(Manufacturing Method)

Figure 11:
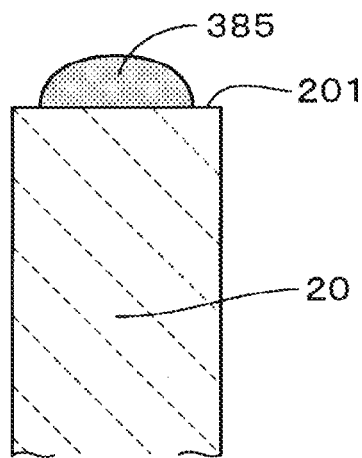
FIG. 11 is an explanatory view showing an element body in which a ceramic slurry is disposed during an arrangement process, in a method of manufacturing a gas sensor according to the embodiment.

The manufacturing method will be described for the case in which the internal protective layer 38 formed on the tip surface 201 of the element body 20 in the longitudinal direction L and on the side faces of the element body 20, is formed only at positions on the element body 20 that are closer to the tip end L1 in the longitudinal direction L than is the tip position 341a of the heating element 341. In manufacturing the sensor element 2 of the gas sensor 1, paste for forming the pair of electrodes 311, 312 is disposed on a flat sheet for constituting the solid electrolyte body 31, and paste for forming the heater 34 is disposed on flat sheets for constituting the insulators 33A and 33B. The flat sheets constituting the insulators 33A and 33B are then laminated on the flat sheet constituting the solid electrolyte body 31 to form an intermediate part of the element body 20. Next as shown in FIG. 11, in an arrangement step, a ceramic slurry 385 for forming the internal protective layer 38 is disposed on the tip surface 201 of the element body 20 in the longitudinal direction L. At this time, the ceramic slurry swells in a curved surface shape, due to surface tension or the like.

Figure 12:
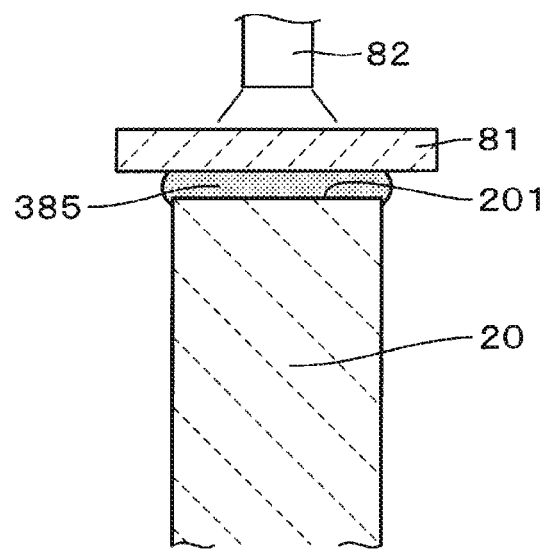
FIG. 12 is an explanatory view showing an element body in which a ceramic slurry is crushed by a film forming plate during a film forming process, in the method of manufacturing a gas sensor according to the embodiment.
Figure 13:
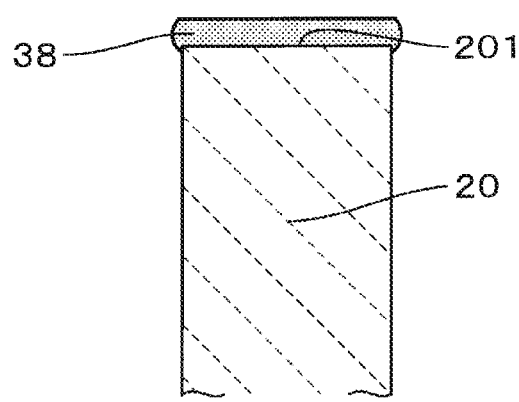
FIG. 13 is an explanatory view showing an element body in which a ceramic slurry is crushed in the film forming step of the method of manufacturing a gas sensor according to the embodiment.

Next as shown in FIG. 12, in a film forming step, the ceramic slurry 385 is crushed by a film forming plate 81 to obtain a uniform thickness. At this time, a force is applied to the film forming plate 81, pressing the plate toward the tip surface 201 of the element body 20. The thickness of the ceramic slurry 385 is thereby made uniform, by the tip surface 201 of the element body 20 and the film forming plate 81. Next as shown in FIG. 13, after the film forming plate 81 is separated from the element body 20, the ceramic slurry 385, having a uniform thickness, is cured or dried.

In addition to ceramic particles and water as a solvent, a photocurable resin (ultraviolet (UV) curable resin, etc.) can be mixed with the ceramic slurry 385. The ceramic slurry 385 is then formed to a uniform thickness as shown in FIG. 12, and is hardened by being irradiated with light (such as ultraviolet light) from a light irradiation device 82, utilizing the fact that a photocurable resin can be cured and hardened by light.

A transparent glass plate, having the property of readily transmitting light, can be used as the film forming plate 81. Excess ceramic slurry 385 can be scraped off and removed by sliding the film-forming plate 81 in a direction parallel to the tip surface 201 of the element body 20.

The ceramic slurry 385 for the internal protective layer 38, disposed on the tip surface 201 of the element body 20, is dried after being solidified. Next, ceramic slurry for the surface protective layer 37 is disposed on the surface of the dried ceramic slurry 385 and on the surface of the element body 20 at the tip end L1 in the longitudinal direction L. The ceramic slurry for the surface protective layer 37 can be applied for example by an immersion method in which a tip portion of the element body 20 in the longitudinal direction L is dipped in a ceramic slurry solution, or by an injection method in which ceramic slurry is injected onto a tip portion of the element body 20 in the longitudinal direction L.

Next, the element body 20 provided with respective portions of the ceramic slurry 385 is heated to a predetermined firing temperature, and the element body 20 and ceramic slurry portions 385 are thereby fired to form the sensor element 2. The photocurable resin that has been mixed in the ceramic slurry 385 is burnt away in the firing. Here, "ceramic slurry 385" refers to the ceramic slurry for the internal protective layer 38 and the ceramic slurry for the surface protective layer 37.

The pores in the surface protective layer 37 and in the internal protective layer 38 can be formed by mixing a resin material with each portion of ceramic slurry 385 and burning out the resin material during firing. The respective average porosities of the surface protective layer 37 and the internal protective layer 38 can be made different from one other by making the amount, size, etc. of the resin materials that are mixed in the respective portions of ceramic slurry 385 different from one other.

When the internal protective layer 38 is to be formed closer to the base end L2 in the longitudinal direction L than is the maximum temperature position H1 of the element body 20, the internal protective layer 38 can be formed in the same way as for the surface protective layer 37, by the immersion method or by the injection method, etc. In that case, a shielding tape such as masking tape can be attached to those parts of the element body 20 on which the internal protective layer 38 is not to be formed. The shielding tape can be peeled off after the internal protective layer 38 has been formed.

The above form of manufacturing the gas sensor 1 of this embodiment is suitable for manufacturing the sensor element 2 described above. By performing the arrangement step and the film forming step, the tip protective layer portion 380 of the internal protective layer 38 can be formed with as uniform a thickness as possible on the tip surface 201 of the element body 20 in the longitudinal direction L.

(Functions and Effects)

With the gas sensor 1 of this embodiment, in which a sensor element 2 is utilized having an element body 20 provided with two protective layers consisting of the internal protective layer 38 and the surface protective layer 37, a specific positional relationship is devised between the heating element 341 of the heater 34 and the internal protective layer 38. Specifically, in the internal protective layer 38, the base position 381a in the longitudinal direction of the first protective layer portion 381, located on the side of the sensor element 2 facing the heater 34, is disposed between the maximum temperature position H1 in the longitudinal direction L of the element body 20 and the tip position 341a of the heating element 341. Furthermore, on the side of the sensor element 2 where the heater 34 is disposed opposite the solid electrolyte body 31, the second insulator 33B, the first protective layer portion 381 of the internal protective layer 38, and the surface protective layer 37 of the element body 20 are disposed overlapping one other at a position that is closer to the tip end L1 than is the maximum temperature position H1 of the element body 20. Moreover, the second insulator 33B of the element body 20 and the surface protective layer 37 are disposed such as to overlap each other at a position that is closer to the base end L2 than is the maximum temperature position H1 of the element body 20

When using the gas sensor 1 in which the pair of electrodes 311, 312 are controlled to an active temperature by the heat generated by the heating element 341 of the heater 34, heating rapidly occurs in the second insulator 33, the first protective layer portion 381 of the internal protective layer 38, and the surface protective layer 37, which are located at the side of the sensor element 2 where the heater 34 is disposed. At this time, at the position of the sensor element 2 on the side where the heating element 34 is disposed and on the base end L2 side of the sensor element 2 with respect to the maximum temperature position H1 of the element body 20, heat is directly transferred from the second insulator 33B to the surface protective layer 37, without the internal protective layer 38 being interposed between them. As a result, the temperature difference between the second insulator 33B and the surface protective layer 37 is less likely to occur at the position of the sensor element 2 at the base end L2 side of the element body 20 from the maximum temperature position H1, and the protective layer 37 is less likely to be damaged due to the difference in thermal expansion.

On the other hand, on the side of the sensor element 2 where the heater 34 is disposed, at a position that is located closer to the tip end L1 of the sensor element 2 than the maximum temperature position H1 of the element body 20, even if heat is transferred from the second insulator 33B to the surface protective layer 37 via the first protective layer portion 381 of the internal protective layer 38, the surface protective layer 37 is unlikely to be damaged. Furthermore, at positions on the side of the sensor element 2 where the heater 34 is not disposed, even if heat is transferred from the first insulator 33A to the surface protective layer 37 via the internal protective layer 38, a temperature difference and thermal expansion difference between the first insulator 33A and the surface protective layer 37 are less likely to occur, and the surface protective layer 37 will be less likely to be damaged.

(Prior Art Sensor Element)

When the heating element 341 generates heat by energization of the heater 34, the tip of the sensor element 2 in the longitudinal direction L becomes rapidly heated. In the case of a prior art sensor element, the entire circumference of the heating element 341 is covered by the internal protective layer 38 and with the surface protective layer 37, the second insulator 33B in which the heating element 341 is embedded is heated to a high temperature at the position of the sensor element 2 on the side where the heating element 34 faces the solid electrolyte body 31.

Figure 14:
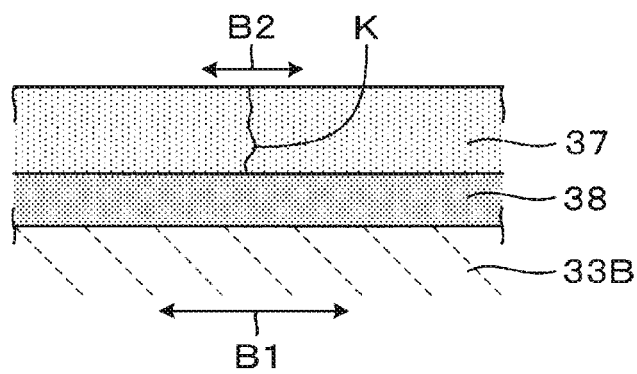
FIG. 14 is an explanatory view showing a condition in which a crack has been produced in an insulator of an example of a prior art sensor element.

At this time, as shown in FIG. 14, the internal protective layer 38 functions as a heat insulating layer, due to its high porosity. A condition thereby arises in which the heat in the second insulator 33B is not readily transferred to the surface protective layer 37 through the internal protective layer 38. Thus, while the thermal expansion amount B1 of the second insulator 33B increases, the thermal expansion amount B2 of the surface protective layer 37 does not increase to the same extent. As a result, a significant difference in thermal expansion arises between the second insulator 33B and the surface protective layer 37.

In particular, the degree of heating by the heating element 341 is high in the vicinity of the heat generating center position H2 of the heating element 341 and in the vicinity of the maximum temperature position H1 of the element body 20. Thus, in the parts of the surface protective layer 37 located near these positions H1 and H2, on the side of the sensor element 2 where the heater 34 faces the solid electrolyte body 31, damage to the surface protective layer 37 such as cracking K may occur due to the difference in thermal expansion between the second insulator 33B and the surface protective layer 37.

However, in the case of the sensor element 2 of the present embodiment, it is ensured that the internal protective layer 38 is not formed at positions where the greatest degree of thermal expansion difference is produced between the second insulator 33B and the surface protective layer 37 due to the heat generated by the heating element 341. Damage such as cracking K is thereby prevented from occurring in the surface protective layer 37 on the second insulator 33B.

Hence with the gas sensor 1 of this embodiment, the surface protective layer 37 can be made less likely to be damaged due to a difference in thermal expansion.

<Confirmation Test>

In this confirmation test, samples of a plurality of types of sensor element 2, having respectively different base positions 381a of the first protective layer portion 381, in the longitudinal direction L, of the internal protective layer 38 were prepared. The magnitude of the voltage required to energize the heater 34 for effecting cracking of the surface protective layer 37 on the second insulator 33B was confirmed, for each of the samples. The ceramic particles used in the aggregate of the surface protective layer 37 of each sample were composed of α-aluminum oxide, and the ceramic particles used in the aggregate of the internal protective layer 38 of each sample were composed of θ-aluminum oxide.

The base position 381a of the first protective layer portion 381, in the longitudinal direction L, of the internal protective layer 38 of respective samples used in the confirmation test was appropriately changed from the 0 mm position, signifying the case in which the base position 381a is located at the tip end surface 201 of the element body 20. Specifically, the base position of the first protective layer portion 381 of the respective samples was changed, toward the base end L2 of the element body 20, from the 0 mm position up to the 9.1 mm position (or to the 9.2 mm, or 9.3 mm position). The confirmation test was performed for the respective cases in which the maximum temperature position H1 of the element body 20 is at positions 4 mm, 5 mm and 5.5 mm from the tip surface 201 of the element body 20, i.e., positions successively changed toward the base end L2. The confirmation test results corresponding to these maximum temperature positions H1 are shown below, as test 1, test 2 and test 3 respectively.

In each confirmation test, the voltage applied to the heater 34 was increased in steps of 0.5 V until a voltage was reached at which the surface protective layer 37 of the second insulator 33B became cracked. This test was performed 10 times, and the averages of the applied voltage values obtained as results from these 10 repetitions were taken as the voltages at which cracking of the surface protective layer 37 occurs. In the evaluations of the values of the applied voltage at which cracking occurs, a case in which the cracking does not occur until the applied voltage becomes 15 V or more is regarded as "good" (passed), while a case in which cracking occurs when the applied voltage is less than 15 V is regarded as "poor" (failed).

Table 1 shows the results of measurement performed when the maximum temperature position H1 of the element body 20 is 4 mm from the tip surface 201 of the element body 20, toward the base end L2 (Test 1).

TABLE 1

| POSITION OF FIRST PROTECTIVE LAYER OF INTERNAL PROTECTIVE LAYER [mm] | APPLIED VOLTAGE AT WHICH CRACKING OCCURS [V] | EVALUATION |
| --- | --- | --- |
| 9.1 | 12.1 | poor |
| 8.3 | 12.3 | poor |
| 7.6 | 12.4 | poor |
| 7 | 12.6 | poor |
| 6.4 | 12.9 | poor |
| 5.9 | 13 | poor |
| 5.5 | 13 | poor |
| 4.8 | 13.5 | poor |
| 4.3 | 14.6 | poor |
| 3.5 | 15.5 | good |
| 2.8 | 15.6 | good |
| 2.2 | 15.6 | good |
| 1.5 | 15.7 | good |
| 0.6 | 15.7 | good |
| 0 | 15.8 | good |

As shown in Table 1, in the case of a position of 3.5 mm in the longitudinal direction L for the base position 381a of the first protective layer portion 381 of the internal protective layer 38, the surface of the protective layer 37 of the second insulator 33B became cracked only when a voltage of 15 V or more was applied. From this result, it has been confirmed that if the base position 381a of the first protective layer portion 381 in the longitudinal direction L is located closer than 4 mm to the tip end L1 of the element body 20, when the maximum temperature position H1 of the element body 20 is 4 mm, then cracking of the surface protective layer 37 on the second insulator 33B will not occur even if the voltage applied to the heater 34 is to 15 V or more.

Table 2 shows the measurement results obtained when the maximum temperature position H1 of the element body 20 is 5 mm from the tip surface 201 of the element body 20, toward the base end L2 (Test 2).

TABLE 2

| POSITION OF FIRST PROTECTIVE LAYER OF INTERNAL PROTECTIVE LAYER [mm] | APPLIED VOLTAGE AT WHICH CRACKING OCCURS [V] | EVALUATION |
| --- | --- | --- |
| 9.2 | 12 | poor |
| 8.6 | 12 | poor |
| 7.7 | 12.1 | poor |
| 6.9 | 12.3 | poor |
| 6.5 | 12.6 | poor |
| 5.5 | 12.9 | poor |
| 5.2 | 13 | poor |
| 4.8 | 15.3 | good |
| 4 | 15.4 | good |
| 3.4 | 15.4 | good |
| 2.2 | 15.4 | good |
| 1.9 | 15.5 | good |
| 1.3 | 15.5 | good |
| 0.4 | 15.7 | good |
| 0 | 15.7 | good |

As shown in Table 2, in the case of a position of 4.8 mm in the longitudinal direction L for the base position 381a of the internal protective layer 38 of the first protective layer portion 381, the surface of the protective layer 37 of the second insulator 33B became cracked only when a voltage of 15 V or more was applied. From this result, it has been confirmed that if the base position 381a of the first protective layer portion 381 in the longitudinal direction L is located closer than 5 mm to the tip end L1, when the maximum temperature position H1 of the element body 20 is 5 mm, then cracking of the surface protective layer 37 of the second insulator 33B will not occur even if the voltage applied to the heater 34 is to 15 V or more.

Table 3 shows the measurement results when the maximum temperature position H1 of the element body 20 is 5.5 mm from the tip surface 201 of the element body 20, toward the base end L2 (Test 3).

TABLE 3

| POSITION OF FIRST PROTECTIVE LAYER OF INTERNAL PROTECTIVE LAYER [mm] | APPLIED VOLTAGE AT WHICH CRACKING OCCURS [V] | EVALUATION |
| --- | --- | --- |
| 9.3 | 11.9 | poor |
| 9 | 12.1 | poor |
| 8.5 | 12.4 | poor |
| 8.3 | 12.8 | poor |
| 7.8 | 12.9 | poor |
| 6.1 | 13 | poor |
| 5.3 | 15.1 | good |
| 4 | 15.1 | good |
| 3.8 | 15.2 | good |
| 2.1 | 15.2 | good |
| 1 | 15.3 | good |
| 0.5 | 15.3 | good |
| 0 | 15.5 | good |

As shown in Table 3, in the case of a position of 5.3 mm in the longitudinal direction L for the base position 381a of the internal protective layer 38 of the first protective layer portion 381, the surface of the protective layer 37 of the second insulator 33B became cracked only when a voltage of 15 V or more was applied. From this result, it has been confirmed that if the base position 381a of the first protective layer portion 381 in the longitudinal direction L is located closer than 5.5 mm to the tip end L1, when the maximum temperature position H1 of the element body 20 is 5.5 mm, then cracking of the surface protective layer 37 on the second insulator 33B will not occur even if the voltage applied to the heater 34 is set to 15 V or more.

The base positions of the second protective layer portion 382 and the third protective layer portion 383 of the internal protective layer 38 were made closer to the base end L2, in the longitudinal direction L, than the maximum temperature position H1 of the element body 20. The base positions of the second protective layer portion 382 and the third protective layer portion 383 of the internal protective layer 38 in the longitudinal direction L had no effect upon the occurrence of cracking of the surface protective layer 37 of the second insulator 33B.

The present disclosure is not limited to the above embodiments, and may be applied to configuring different embodiments without departing from the gist thereof. Furthermore, the scope of the present disclosure encompasses various modifications, including modifications that come within a range of equivalents. In addition, various combinations, forms, etc., of configuration components that can be envisaged from the present disclosure are included in the technical concepts of the present disclosure.

What is claimed is:

1. A gas sensor provided with a sensor element comprising:
   the sensor element including:
   an element body having a solid electrolyte body provided with at least a pair of electrodes, and having an insulator laminated on the solid electrolyte body, with a heater embedded in the insulator,
   a surface protective layer provided, exposed to a detection target gas, at an outermost surface position on a tip portion of the element body, extending along a longitudinal direction of the element body, and circumferentially covering a heating element of the heater with respect to a central axis along the longitudinal direction of the element body, and
   an internal protective layer provided between the element body and the surface protective layer, and having a lower thermal conductivity or a higher average porosity than the surface protective layer; wherein
   the internal protective layer includes a first protective layer portion, which faces the heater, with at least a base position of the first protective layer portion, in the longitudinal direction, being positioned closer to a tip end of the element body in the longitudinal direction than is a maximum temperature position of the element body in the longitudinal direction; and
   the base position of the first protective layer portion, in the longitudinal direction, is positioned closer to a base end of the sensor element than is a tip position of the heating element such that the base position of the first protective layer portion is located between the maximum temperature position and the tip position of the heating element in the longitudinal direction.

2. The gas sensor according to claim 1, wherein
   the surface protective layer and the internal protective layer are composed of a plurality of ceramic particles bonded to each other, and
   pores are formed within the ceramic particles constituting the internal protective layer.

3. The gas sensor according to claim 2, wherein
   the ceramic particles constituting the surface protective layer are composed of α-aluminum oxide, and
   the ceramic particles constituting the internal protective layer are composed of θ-aluminum oxide or γ-aluminum oxide.

4. The gas sensor according to claim 1, wherein
   a gas chamber for accommodating an electrode and taking in the detection target gas is formed on an inner surface of the insulator that faces the solid electrolyte body,
   a gas introduction section that communicates with the gas chamber and introduces the detection target gas into the gas chamber is formed at a tip position of the insulator, in the longitudinal direction, and
   the internal protective layer covers the gas introduction section.

5. A gas sensor provided with a sensor element comprising:
   the sensor element including:
   an element body having a solid electrolyte body provided with at least a pair of electrodes, and having an insulator laminated on the solid electrolyte body, with a heater embedded in the insulator,
   a surface protective layer provided, exposed to a detection target gas, at an outermost surface position on a tip portion of the element body, extending along a longitudinal direction of the element body, and circumferentially covering a heating element of the heater with respect to a central axis along the longitudinal direction of the element body, and
   an internal protective layer provided between the element body and the surface protective layer, and having a lower thermal conductivity or a higher average porosity than the surface protective layer; wherein
   the internal protective layer includes a first protective layer portion, which faces the heater, with at least a base position of the first protective layer portion, in the longitudinal direction, being positioned closer to a tip end of the element body in the longitudinal direction than is a maximum temperature position of the element body in the longitudinal direction; and
   in the internal protective layer, the base position of the first protective layer portion is located closer to the tip end of the element body in the longitudinal direction than is the maximum temperature position, and
   in the internal protective layer, a base position of a second protective layer portion in the longitudinal direction, which is located on the opposite side to the first protective layer portion, is positioned closer to a base end of the sensor element than is the maximum temperature position.

6. A gas sensor provided with a sensor element comprising:
   the sensor element including:
   an element body having a solid electrolyte body provided with at least a pair of electrodes, and having an insulator laminated on the solid electrolyte body, with a heater embedded in the insulator,
   a surface protective layer provided, exposed to a detection target gas, at an outermost surface position on a tip portion of the element body, extending along a longitudinal direction of the element body, and circumferentially covering a heating element of the heater with respect to a central axis along the longitudinal direction of the element body, and
   an internal protective layer provided between the element body and the surface protective layer, and having a lower thermal conductivity or a higher average porosity than the surface protective layer; wherein
   the internal protective layer includes a first protective layer portion, which faces the heater, with at least a base position of the first protective layer portion, in the longitudinal direction, being positioned closer to a tip end of the element body in the longitudinal direction than is a maximum temperature position of the element body in the longitudinal direction; and the base position of the first protective layer portion in the internal protective layer is located closer to the tip end of the element body than is a tip position of the heating element, and in the internal protective layer, a base position in the longitudinal direction of a second protective layer portion, which is located on the opposite side to the first protective layer portion, is positioned closer to a base end of the sensor element than is a base position of the heating element.

7. A method of manufacturing a gas sensor including a sensor element comprising:

the sensor element including:

an element body having a solid electrolyte body provided with at least a pair of electrodes, and having an insulator laminated on the solid electrolyte body, with a heater embedded in the insulator, a surface protective layer provided, exposed to a detection target gas, at an outermost surface position on a tip portion of the element body extending along a longitudinal direction of the element body and circumferentially covering a heating element of the heater, with respect to a central axis along the longitudinal direction of the element body, and an internal protective layer provided between the element body and the surface protective layer, and having a lower thermal conductivity or a higher average porosity than the surface protective layer; wherein the internal protective layer includes a first protective layer portion, which faces the heater, with at least a base position of the first protective layer portion, in the longitudinal direction, being positioned closer to a tip end of the element body in the longitudinal direction than is a maximum temperature position of the element body in the longitudinal direction; and the base position of the first protective layer portion, in the longitudinal direction, is positioned closer to a base end of the sensor element than is a tip position of the heating element such that the base position of the first protective layer portion is located between the maximum temperature position and the tip position of the heating element in the longitudinal direction;

the manufacturing method includes:

an arrangement step of arranging a ceramic slurry to form the internal protective layer on the tip surface of the element body, with respect to in the longitudinal direction of the element body; and a film forming step of crushing the ceramic slurry with a film forming plate to obtain a uniform thickness, then curing or drying the ceramic slurry.

* * * * *